US012568974B2

(12) United States Patent
Gan et al.

(10) Patent No.:    US 12,568,974 B2
(45) Date of Patent:         Mar. 10, 2026

(54) FACE MASK, COMPOSITES, IRON-IRON OXIDE COMPOSITIONS AND METHODS OF MANUFACTURE AND USE THEREOF

(71) Applicant: N&E INNOVATIONS PTE. LTD., Singapore (SG)

(72) Inventors: Didi Gan, Singapore (SG); Jie Lin Jaslyn Lee, Singapore (SG)

(73) Assignee: N&E Innovations Pte. Ltd., Singapore (SG)

( * ) Notice: Subject to any disclaimer, the term of this patent is extended or adjusted under 35 U.S.C. 154(b) by 620 days.

(21) Appl. No.: 17/995,905

(22) PCT Filed: Apr. 7, 2021

(86) PCT No.: PCT/SG2021/050192
§ 371 (c)(1),
(2) Date: Oct. 10, 2022

(87) PCT Pub. No.: WO2021/206634
PCT Pub. Date: Oct. 14, 2021

(65) Prior Publication Data
US 2025/0057167 A1      Feb. 20, 2025

(30) Foreign Application Priority Data

Apr. 11, 2020    (SG) ............................. 10202003309S
Jun. 8, 2020    (SG) ............................ 10202005375Y

(51) Int. Cl.
| | |
|---|---|
| *A01N 59/16* | (2006.01) |
| *A01N 25/34* | (2006.01) |
| *A01P 1/00* | (2006.01) |
| *A41D 13/11* | (2006.01) |
| *A62B 18/08* | (2006.01) |
| *A62B 23/02* | (2006.01) |
| *B01D 39/16* | (2006.01) |
| *B01D 39/18* | (2006.01) |

(52) U.S. Cl.
CPC .............. *A01N 59/16* (2013.01); *A01N 25/34* (2013.01); *A01P 1/00* (2021.08); *A41D 13/1192* (2013.01); *A62B 18/084* (2013.01);
*A62B 23/025* (2013.01); *B01D 39/1623* (2013.01); *B01D 39/18* (2013.01); *B01D 2239/0407* (2013.01); *B01D 2239/0428* (2013.01); *B01D 2239/0442* (2013.01); *B01D 2239/0478* (2013.01)

(58) Field of Classification Search
CPC .......................... A26B 23/025; B22F 2301/35
See application file for complete search history.

(56) References Cited

U.S. PATENT DOCUMENTS

| | | | |
|---|---|---|---|
| 2010/0047180 A1 | 2/2010 | Zeng et al. | |
| 2011/0104073 A1* | 5/2011 | Zeng ........................ | B82Y 5/00 |
| | | | 427/127 |
| 2013/0029920 A1 | 1/2013 | Brimble et al. | |
| 2020/0069755 A1* | 3/2020 | Rana .................... | A61K 31/353 |

FOREIGN PATENT DOCUMENTS

| | | | | |
|---|---|---|---|---|
| JP | 2015-30717 A | 2/2015 | | |
| WO | WO-2008140831 A2 * | 11/2008 | ............. | A61K 33/26 |

OTHER PUBLICATIONS

Manquian-Cerda et al., Ecotox Env Safety, 145, 2017, 69-77.*
International Search Report and Written Opinion for International Application No. PCT/SG2021/050192 mailed Aug. 7, 2021, 9 pages.
Xu et al., "Applications of Iron Oxide-Based Magnetic Nanoparticles in the Diagnosis and Treatment of Bacterial Infections", *Frontiers in Bioengineering and Biotechnology* vol. 7, Article 141, Jun. 2019.

* cited by examiner

*Primary Examiner* — Kyle A Purdy
(74) *Attorney, Agent, or Firm* — Lathrop GPM LLP; Brian C. Trinque; Christine M. Greene

(57) ABSTRACT

The present invention relates, in general terms, to a face mask. The present invention also relates, in general terms, to composite material, iron-iron oxide compositions and their methods of fabrication thereof. In particular, the iron-iron oxide composition comprises a cashew testa extract and iron particles and/or oxide core-shell particles. The iron-iron oxide composition can be used as an anti-microbial composition.

19 Claims, 12 Drawing Sheets

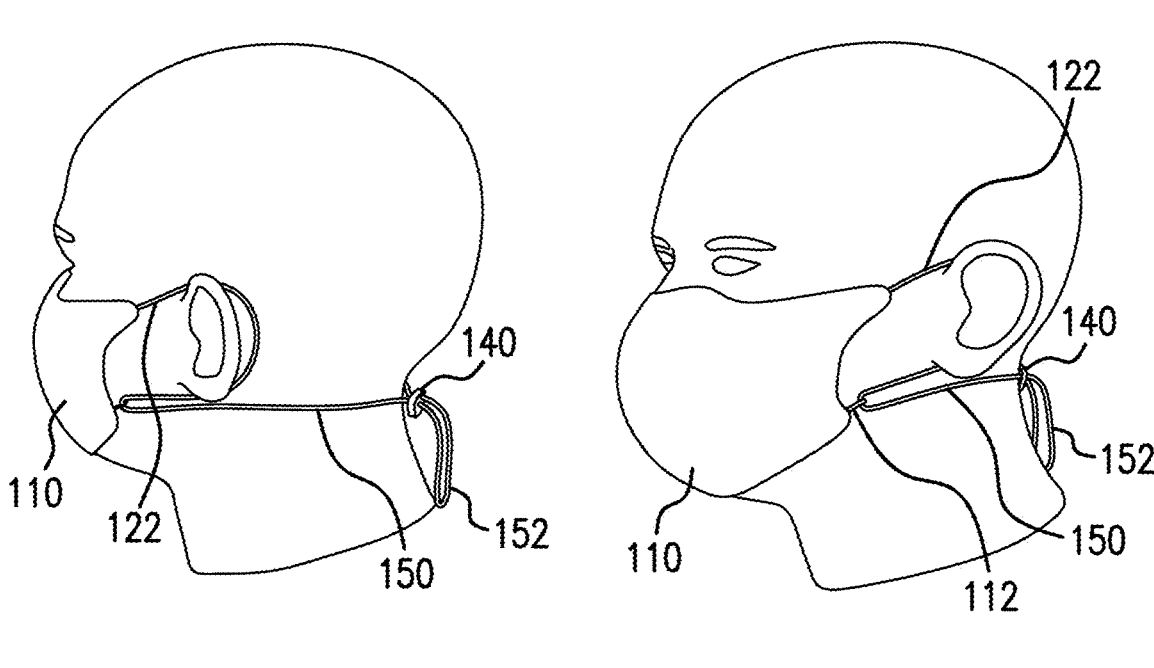
FIGURE 6          FIGURE 7
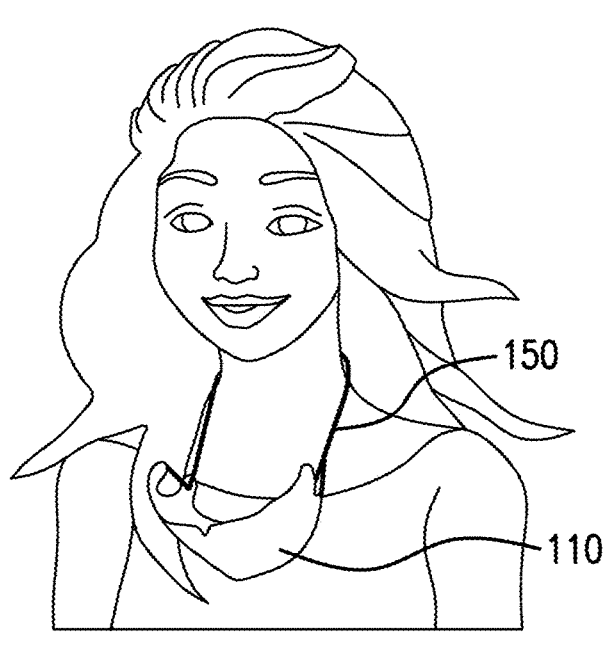
FIGURE 8

FACE MASK, COMPOSITES, IRON-IRON OXIDE COMPOSITIONS AND METHODS OF MANUFACTURE AND USE THEREOF

TECHNICAL FIELD

The present invention relates, in general terms, to a face mask. The present invention also relates, in general terms, to composite material, iron-iron oxide compositions and their methods of fabrication thereof.

BACKGROUND

Microbial infections and the development of antimicrobial resistance have recently been receiving attention as one of the more important critical issues faced by public health authorities. Microbiological contamination refers to the non-intended or accidental introduction of microbes such as bacteria, yeast, mould, fungi, virus, prions, protozoa or their toxins and by-products. There is also rising concerns regarding the increase in Hospital-Acquired Infections (HAIs) cases.

Diseases caused by zoonotic highly pathogenic viruses are of increasing concern to health authorities. Prominent recent examples are the outbreaks of diseases caused by the SARS and MERS coronaviruses (SARS-CoV, MERS-CoV), the avian influenza virus (AIV) and Ebola virus (EBOV). With increasing globalization, the threat of the diseases caused by such highly pathogenic viruses has been amplified. In some cases, there is the added threat that the viruses could be used for bioterrorism.

Highly pathogenic viruses or HP viruses includes all viruses where there is currently no vaccine and where the viruses are capable of causing fatal systemic disease in humans if untreated and/or which might have the potential to be used as bioterror weapons.

As a specific example, and more recently, coronavirus disease (COVID-19) is an infectious disease caused by a new virus. The disease causes respiratory illness with symptoms such as cough, fever, and in more severe cases, breathing difficulties.

Apart from the fact that all these viruses are capable of causing fatal illness in humans and in no case is there is an effective treatment or vaccine, the other important commonality is that they are all zoonotic, i.e. originally transmitted from animals to humans. By way of example, the animal source for AIV is birds, for EBOV it is fruit bats, and for COVID-19 is bats.

Another common feature is that they have relatively high mortality rates in humans. In some cases, such as avian influenza, they have the potential to become pandemic, causing large numbers of deaths and major challenges for frontline healthcare workers who are at risk of contracting the virus. A further concern is that some of the viruses responsible for these diseases may have the capacity to be developed as bioterror weapons.

Such diseases spread primarily through contact with an infected person when they cough or sneeze, or through contact with a surface that carries virus particles, followed by touching the eyes, nose, or mouth. To prevent the spread of disease, recommended measures include frequent hand-washing, avoiding touching the face, and avoiding close contact (e.g. within 1 metre) with people who are unwell.

Alternatively, a face mask can be used. A face mask can cover the whole face or part of it. Certain face masks may be specially adapted for medical purposes, either to protect the wearer from contamination and dangerous particulates, or to prevent pathogens from being dispersed by the wearer.

Surgical face masks are commonly worn by health care professionals and patients to prevent the spread of germs and/or viruses. Such masks can catch bacterial and viral particles released from the wearer's mouth and nose. However, such masks are generally loose fitting with the wearer's exhalation gases flowing around the perimeter of the face mask, typically at the lower edges of the cheeks and around the chin of the wearer. Accordingly, concerns have arisen as to the effectiveness of such face masks in protecting patients and health care professionals.

In a systematic review to find the effectiveness of physical interventions to interrupt or reduce the spread of respiratory viruses, wearing a mask was shown to reduce the spread of respiratory virus significantly, from an odds ratio of 0.45 by washing hands to an odds ratio of 0.09 by wearing a N95 mask. This suggests that spread of respiratory viruses can be effectively prevented by hygienic measures in younger children and within households using masks alone.

However, surgical masks are suitable for one-time use only. The risk of infection increases significantly if the mask is reused. This in turn creates an environmental concern, as such masks are usually plasticised paper products. In this regard, the use of surgical masks is unsustainable.

Further, proper disposal of face masks is required to correctly curb the spread of diseases. With disposable face masks, it has been observed that the incidence of littering has increased, which may facilitate the spread of disease.

An additional problem with existing face masks is that they can be inconvenient to store when not in use.

A further problem is that face masks are typically made as "one size fits all" products, without accommodating different user face shapes or head shapes, thereby potentially causing difficulty for users to ensure that the mask fits sufficiently tightly around the face.

The growing concern regarding cleanliness in various industries has led to an increased demand for antimicrobial products. These can be used to protect surfaces against microorganisms and has applications in medical devices and packaging. The demand for antimicrobial additives is also rapidly expanding due to growing population and urbanization.

Towards this end, the global antimicrobial coatings market size was valued at USD 7.1 billion in 2019 and is expected to grow at a compound annual growth rate (CAGR) of 12.8% from 2020 to 2027.

Current anti-microbial products in the market rely on titanium, zinc and silver compounds to impart the anti-microbial effect. While effective, such elements are expensive and are also toxic and prone to heavy metal contamination. The anti-microbial efficacy is also low due to its dependence on photo irradiation.

There are further concerns regarding whether such products are toxic to humans and animals. Further, when harsh chemicals are used during the synthesis, there is always a possibly that the toxic precursors such as heavy metals are retained in the final products such that extensive washing is required. This increases production cost.

It would be desirable to overcome or alleviate at least one of the above-described problems, or at least to provide a useful alternative.

SUMMARY

The present invention is predicated on the understanding that certain natural products are anti-microbial. In particular, the inventors have found that an extract of cashew testa is advantageous in that it has an anti-microbial efficacy. For example, the extract was found to possess anti-bacterial properties against gram negative bacteria *Escherichia coli* and gram positive bacteria *Staphylococcus aureus*, and has anti-cancer properties against the human liver cancer cells HEPG2. The natural product extract can be applied in a green solvent and can have a penetrative effect when tested on surfaces and textile. Further, when combined with other components, a synergistic (or at least additive) anti-microbial effect was observed. For example, the cashew testa extract can be used as a precursor for synthesising iron particles and/or iron oxide particles. As these compositions are synthesised/made from biological or natural materials, they can be safe for human and animals. Such green biosynthesis is cost effective with less waste production, nontoxic, and environmentally friendly. The present invention has applications as an antimicrobial finish for textiles.

The present invention provides an iron-iron oxide composition, comprising:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof; and wherein the iron-iron oxide particles is at least partially passivated by the protein, amino acid, sugar, phenolic compounds, or a combination thereof.

In some embodiments, the iron-iron oxide particles is further at least partially passivated by a carboxylate acid moiety or a hydroxyl moiety.

In some embodiments, the carboxylic acid is selected from fatty acid, aromatic carboxylic acid, dicarboxylic acid, tricarboxylic acid, keto acid, α-hydroxyl acid, divinylether fatty acid, phosphoric acid, polyphosphoric acid, tungstic acid, vanadic acid, molybdic acid, heteropolyacid, or a combination thereof.

In some embodiments, the iron-iron oxide particles comprises elemental Fe, FeO, $Fe_2O_3$, $Fe_3O_4$, or a combination thereof.

In some embodiments, the iron-iron oxide particles have an average particle size of about 1 μm to about 800 μm.

In some embodiments, the shell further comprises a component from cashew testa extract.

In some embodiments, the shell has a thickness of about 5 nm to about 1 μm.

In some embodiments, the iron-iron oxide composition has an iron content relative to the iron-iron oxide composition of about 20 w/w % to about 80 w/w % and an oxygen content relative to the iron-iron oxide composition of about 15 w/w % to about 40 w/w %.

In some embodiments, the iron-iron oxide composition has a carbon content relative to the iron-iron oxide composition of about 4 w/w % to about 50 w/w %.

In some embodiments, the iron-iron oxide composition further comprises an excipient selected from stabilising agent, dispersant, colorant, or a combination thereof.

The present invention also provides a method of synthesising an iron-iron oxide composition, comprising:

reacting a cashew testa extract with iron particles and an iron oxide precursor in order to form iron-iron oxide core-shell particles having an elemental iron core or an iron alloy core, and an iron oxide shell;

wherein the cashew testa extract comprises a component selected from protein, amino acid, sugar, phenolic compounds or a combination thereof; and wherein the iron particles and/or iron oxide particles are at least partially passivating by the cashew testa extract.

In some embodiments, the iron oxide precursor is an iron (III) salt.

In some embodiments, an anion of the iron (III) salt is selected from nitrate, chloride, bromide, fluoride, iodide, sulphate, oxalate, perchlorate, phosphate, tetrafluoroborate, or a combination thereof.

In some embodiments, the reaction is performed at about 5° C. to about 80° C.

In some embodiments, the reaction is performed for about 1 min to about 24 h.

In some embodiments, the iron particles and an iron oxide precursor are homogenously mixed before reacting with the cashew testa extract.

In some embodiments, when the cashew testa extract comprises phenolic compounds, a weight ratio of the phenolic compounds to iron particles and iron oxide precursor is about 1:500 to about 500:1.

The present invention also provides a method of disinfecting a non-biological surface, comprising:

a) contacting an iron-iron oxide composition as disclosed herein with the non-biological surface.

In some embodiments, the method further comprises a step prior to (a) of applying the iron-iron oxide composition to an application medium.

The present invention also provides a method of killing microbial in the dark by using the iron-iron oxide composition as disclosed herein.

The present invention also provides a method of disinfecting a surface using iron-iron oxide composition, wherein the iron-iron oxide composition can provide at least a 2 log reduction in microbial activity after 5 min.

The present invention also provides a composite material, comprising a porous fabric impregnated with an iron-iron oxide composition and coated with a water repellent coating on at least one side of the porous fabric, wherein the iron-iron oxide composition is present relative to the composite material at about 0.1% w/w to about 5% w/w;

wherein the water repellent coating has a thickness of about 10 μm to about 500 μm.

It should be appreciated that the composite material can be used to form a face covering structure and/or a composite fabric layer of a face mask. This is predicated on the understanding that while anti-bacterial and anti-viral compounds/compositions can be applied onto a hard, non-porous surface to provide a desirable effect, the use of anti-bacterial and anti-viral compounds/compositions on a porous surface has not been tested. Further, due to the cost, the application of anti-bacterial and anti-viral compounds/compositions on a disposable face mask does not make commercial and economic sense. Advantageously, the composite material provides protection against the inhalation of viruses and bacterial cells. The composite material also acts to kill the viruses and bacterial cells which are in contact with the composite layer of the face mask. Further advantageously, as the iron-iron oxide composition is retained in the composite material, the face mask is re-usable, even after washing for 20 times. In this regard, at least 70% of the iron-iron oxide composition is retained in the composite fabric layer after washing for 20 times.

In some embodiments, the porous fabric of the composite material is a fabric comprising cotton and spandex, wherein the cotton relative to the fabric is about 90% w/w, wherein the spandex relative to the fabric is about 10% w/w.

In some embodiments, the iron-iron oxide composition comprises iron, iron (II) oxide and iron (III) oxide.

In some embodiments, the iron-iron oxide composition comprises elemental Fe, $Fe_3O_4$, and amino acid, carbohydrate or a mixture thereof.

In some embodiments, the amino acid, carbohydrate or a mixture thereof is selected from glycine, alanine, valine, leucine, isoleucine, methionine, proline, phenylalanine, tryptophane, serine, threonine, cysteine, tyrosine, asparagine, aspartic acid, glutamine, glutamic acid, lysine, arginine, histidine, taurine, betaine, N-methylalanine, zein, glucose, galactose, fructose, xylose, sucrose, lactose, maltose, trehalose, sorbitol, mannitol, maltodextrin, raffinose, stachyose, fructo-oligosaccharide, amylose, amylopectin, modified starch, glycogen, cellulose, hemicellulose, ethylcellulose, methylcellulose, pectin, hydrocolloid and a combination thereof.

In some embodiments, the iron-iron oxide composition has a particle size of about 1 μm to about 800 μm.

In some embodiments, the shell has a thickness of about 50 nm to about 400 nm.

In some embodiments, the water repellent coating is selected from perfluorobutanesulfonic acid, perfluorooctanoic acid, perfluorohexanoic acid, Scotchgard, perfluorooctanesulfonic acid, paraffin (and other hydrocarbon based solutions), silica nanoparticles and silanes (e.g. alkyl trialkoxy silanes).

Advantageously, the water repellent coating on the composite material can provide fluid resistance to the outer composite fabric layer, thus providing a better shielding effect from air-borne droplets to the user.

The present invention also provides a method of manufacturing a composite material, comprising:
a) impregnating a porous fabric with an iron-iron oxide composition; and
b) coating the porous fabric with a water repellent coating on at least one side of the porous fabric in order to form the composite material,
wherein the iron-iron oxide composition is present relative to the composite material at about 0.1% w/w to about 5% w/w;
wherein the water repellent coating has a thickness of about 10 μm to about 500 μm.

The present invention provides a face mask comprising:
a face covering structure configured to cover at least a mouth and nasal passages of a user; and
an attachment structure comprising:
a drawstring attached to opposed sides of the face covering structure, for securing the face covering structure to a face of the user; and
a fastener releasably attached to the drawstring to maintain the drawstring in a tightened or loosened position;
wherein the drawstring is arranged to form ear straps for looping behind respective ears of the user and a neck strap for looping behind a neck of the user; and wherein the fastener is attached to the neck strap; and
wherein the face covering structure comprises a composite material as disclosed herein.

Advantageously, the attachment structure provides greater ease to a user in tightening the face mask to provide a more effective barrier against ingress or egress of pathogen-bearing droplets, while also providing greater convenience of storage while not in use.

The fastener may be a cord lock.

In certain embodiments, each ear strap comprises a section of the drawstring that is attached at a first point on one of the opposed sides, and is threaded through an attachment loop at a second point that is spaced from the first point.

The neck strap may comprise a section of the drawstring that spans between respective attachment loops.

In certain embodiments, the drawstring is threaded through eyelets of the cord lock.

In some embodiments, the face covering structure comprises a nasal cushion located at an inner surface thereof.

The face covering structure may comprise a filter layer. For example, the filter layer may be sandwiched between an outer fabric layer and an inner fabric layer. The outer fabric layer may be a composite fabric layer.

In some embodiments, the filter layer is replaceable. For example, the face covering structure may comprise a sleeve for accommodating the filter layer.

In some embodiments, the face covering structure is configured to at least partially cover a submental triangle region of the user.

In some embodiments, the face covering structure further comprises a lower fabric attached to a longitudinal side of the outer fabric layer and an inner fabric layer, and distal from the nasal cushion, such that when in use, the lower fabric is connected to the face covering structure at an angle of more than 20°.

In some embodiments, the face covering structure is configured to at least partially cover a zygomatic region of the user.

In some embodiments, the face covering structure further comprises two extensions each extending out from the first point on the opposed sides of the face covering structure, for attaching to the drawstring.

Advantageously, this reduces a pulling pressure of the ear straps on the ears and hence provide for greater comfort to the user.

BRIEF DESCRIPTION OF THE DRAWINGS

Embodiments of the present invention will now be described, by way of non-limiting example, with reference to the drawings in which:

FIG. 6 is a rear left view of a user wearing the face mask, showing attachment of a tie of the face mask to the user's ear;

FIG. 7 is a front left view of the user wearing the face mask;

FIG. 8 shows a user with the face mask in a stored position;

DETAILED DESCRIPTION

Figures 1, 2:
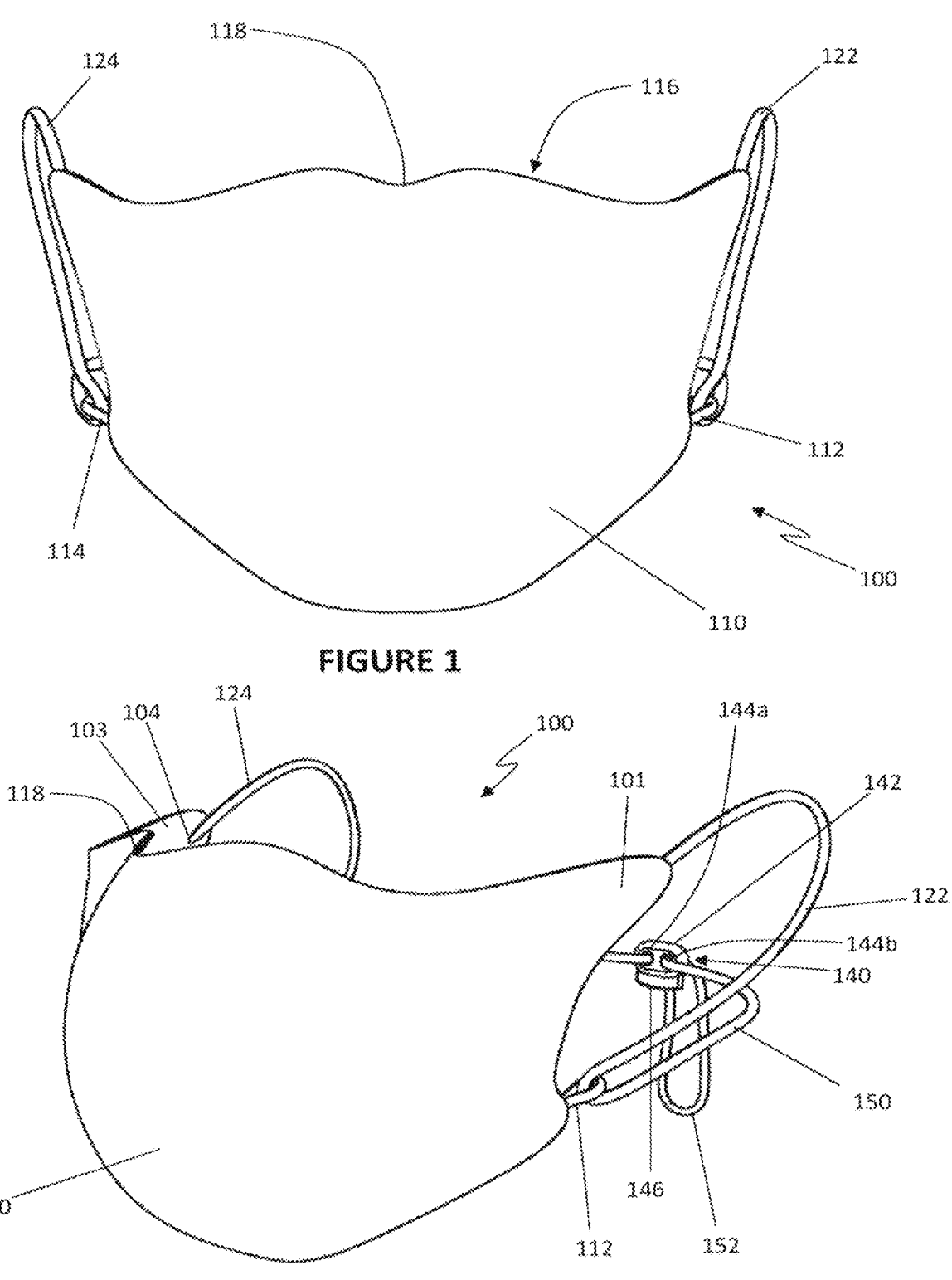
FIG. 1 is a front view of a face mask according to certain embodiments.
FIG. 2 is an isometric view of the face mask as seen from the top left.
Figure 3:
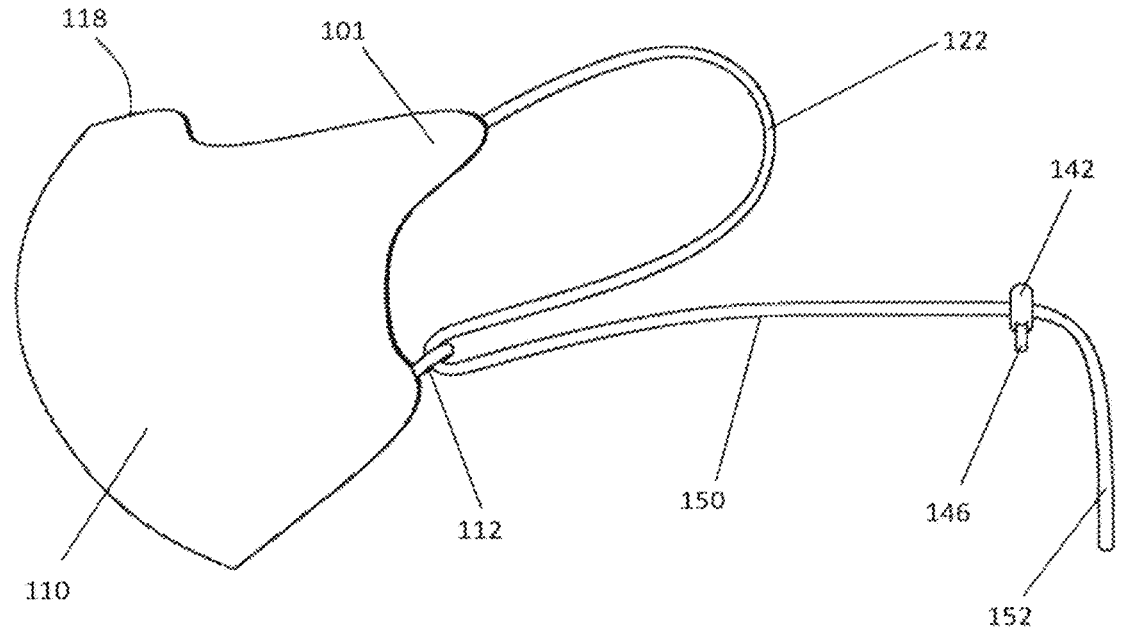
FIG. 3 is a left side view of the face mask.
Figure 4:
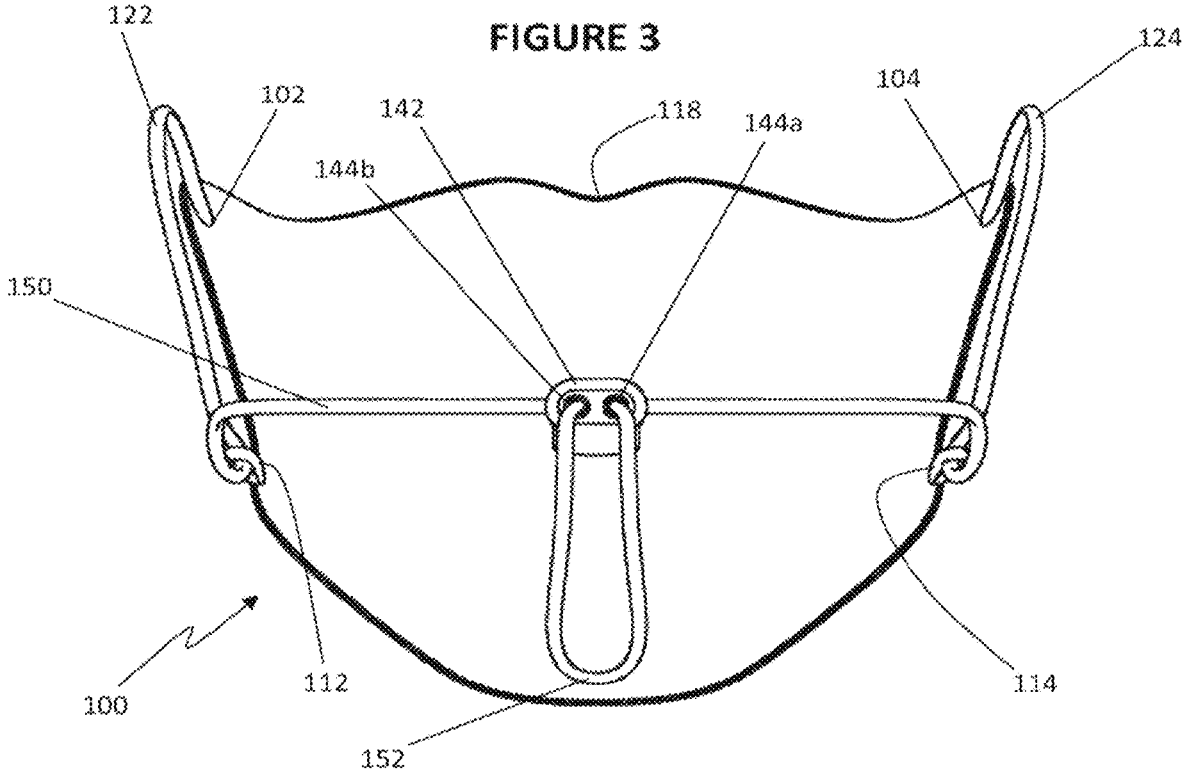
FIG. 4 is a rear view of the face mask.

Embodiments of the present invention relate to a face mask having an attachment structure that provides greater ease to a user in tightening the face mask to provide a more effective barrier against ingress or egress of pathogen-bearing droplets, while also providing greater convenience of storage while not in use.

Referring initially to FIGS. 1-4, a face mask 100 according to certain embodiments comprises a face covering structure 110. The face covering structure 110 is configured to cover at least a mouth and nasal passages of a user. For example, as shown in FIGS. 6 and 7, the face covering structure 110 may extend above the tip of the user's nose, and in some examples up to about halfway up the bridge of the nose. The face covering structure 110 has an upper contour 116 with an indented central portion 118 at the position of the nose bridge.

The face covering structure 110 comprises a composite material as disclosed herein. The composite material provides an anti-microbial function to the face mask by trapping and killing microbes near or on the surface of the face covering structure.

The face mask 100 also comprises an attachment structure for securing the face covering structure 110 to the user's face. The drawstring is attached to opposed sides of the face covering structure 110. For example, as best shown in the rear view of FIG. 4, opposed ends of the drawstring are attached at points 102 and 104 at opposed sides of an upper section of the face covering structure 110. The opposed ends may be attached at points 102, 104 by any suitable method, such as by stitching, adhesives, thermal bonding and the like.

The drawstring is arranged to form a pair of ear straps 122, 124. In use, the ear straps 122, 124 loop behind the respective ears of the user (see FIGS. 6 and 7, which show the left ear strap looping behind the user's left ear).

The drawstring is also arranged to form a neck strap 150 that loops behind a neck of the user, and which may be formed by a section of the drawstring that spans between attachment loops 112, 114 located on opposed sides of the face covering structure 110.

The attachment structure also comprises a fastener 140 that is releasably attached to the drawstring, in particular to the neck strap 150. The fastener is arranged such that it maintains the drawstring in a loosened or tightened position, as desired.

For example, to tighten the drawstring to secure the face covering portion 110 tightly over the face of the user, the user may release the fastener 140, pull the neck strap 150 in a backward direction away from their neck to shorten the neck strap 150, and then re-attach the fastener 140 to maintain the drawstring in the tightened position.

To loosen the drawstring, for example when the face mask is not required to be used, the user may again release the fastener 140, and lengthen the neck strap 150, for example by pulling the face covering portion 110 away from their face, and then re-attach the fastener 140 to maintain the drawstring in the loosened position. Advantageously, the loosened drawstring may be used to stow the face covering portion 110 with the neck strap 150 still looped around the user's neck, as shown in FIG. 8. This provides "hands-free" convenience to the user, in that the mask may hang around her neck while loosened; further, there is no need to keep the mask in a storage bag should there be a need to remove it temporarily.

By providing neck strap 150 in addition to ear straps 122, 124, the mask 100 is more securely retained on the user's head, reducing the risk of the mask falling off when the user is "on the go", as the straps secure the mask 100 to both the head and ears, instead of just the ears.

The fastener 140 may be a cord lock, for example. The cord lock 140 may have a lock body 142 which has a pair of eyelets 144a, 144b to receive the drawstring. The cord lock 140 also comprises a plunger 146 which is biased by a spring or other biasing element to trap the drawstring when the drawstring is threaded through the eyelets 144a, 144b. The plunger 146 is depressable to free the drawstring to enable shortening or lengthening of the neck strap 150.

As mentioned above, the fastener is attached to the neck strap 150, and is typically located at an intermediate section thereof, such that a terminal portion 152 of the neck strap 150 can be grasped by the user when wishing to tighten the neck strap 150, and thus the face covering portion 110.

In certain embodiments, first ear strap 122 comprises a section of the drawstring that is attached at a first point 102 on one of the opposed sides of the face covering structure 110, and is threaded through an attachment loop 112 at a second point that is spaced from the first point 102. The first point 102 may be located at or near a top of the face covering structure 110, for example on a wing 101 that extends from an upper region of the face covering structure 110 to extend over a cheekbone of the user when the mask 100 is worn (FIG. 7). Similarly, second ear strap 124 comprises a section of the drawstring that is attached at a first point 104 on the other of the opposed sides of the face covering structure 110, and is threaded through an attachment loop 114 at a second point that is spaced from the first point 104. The first point 104 may be located on a wing 103 that extends from an upper region of the face covering structure 110 on the other side, to extend over the user's other cheekbone.

The ear straps 122 and 124 and neck strap 150 may be formed by threading the drawstring through attachment loops 112, 114 that are provided at opposed sides of a lower part of the face covering portion 110. A lower end of ear strap 122 may loop through attachment loop 112, and likewise, a lower end of ear strap 124 may loop through attachment loop 114. Accordingly, the lower ends of the respective ear straps 122 and 124 transition into respective ends of the neck strap 150. By arranging the ear straps 122, 124 and neck strap 150 in this way, it is possible to tighten the face mask 100 at both the ear regions and the neck region by a single pull of the drawstring, for example by grasping and pulling the terminal portion 152 of the neck strap 150.

Facilitating tightening of the mask 100 in this way also increases the likelihood that a tight seal can be formed around the user's face, independent of their face shape.

Mask 100 therefore enables a more personalised fit than existing "one size fits all" products.

The attachment structure may be incorporated into mask 100 in the following way. First, attachment loops 112 and 114 are affixed at opposite sides to the lower part of the face covering structure 110 (for example, by stitching, though other methods are also possible). Next, a first end of a cord formed from a length of material (which may be a textile or fabric material, or a polymer material) is attached at the attachment point 102 on wing 101. The attachment may be by stitching, adhesives, heat sealing, stapling, or any other suitable means. The cord is then looped through the first attachment loop 112 to form the first ear strap 122. Next, the cord is looped through the eyelet 144*b* of cord lock 140 and back round through the eyelet 144*a* and the second attachment loop 114 to form the neck strap 150, with a terminal loop 152 of the neck strap 150 being located on a side of the cord lock 140 distal to the ear strap 122. Finally, the cord is attached at its second end to the attachment point 104 on wing 103, in like fashion to the attachment of the first end at attachment point 102.

In at least some embodiments, the face covering structure 110 may comprise a layered structure, including at least a filter layer. The filter layer may be sandwiched between an outer fabric layer (such as a layer of a composite fabric) and an inner fabric layer.

Figure 5:
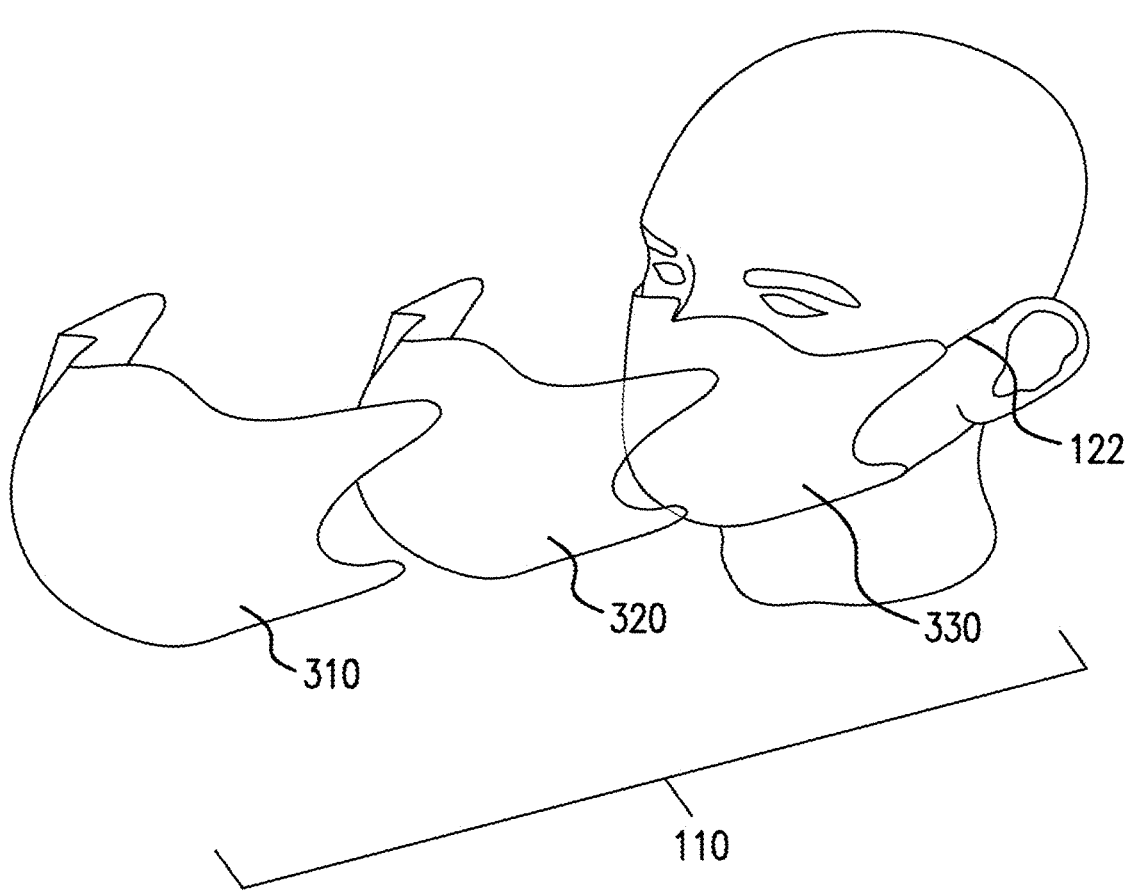
FIG. 5 is an exploded view of the face mask, showing part thereof positioned on a user's face.

For example, as shown in the exploded view of FIG. 5, the face covering structure 110 may comprise a filter layer 320 sandwiched between an outer composite fabric layer 310 and an inner fabric layer 330.

In some embodiments, the outer composite fabric layer 310, the inner fabric layer 330 and the filter layer 320 are stitched together in order to form the face covering structure 110.

In some embodiments, the face covering structure may comprise a nasal cushion (not shown) that is positioned within the face covering structure to cushion the bridge of the user's nose in use. For example, the nasal cushion may be embedded in, or affixed to, inner fabric layer 330, such as in the bridge region 118 of the face covering structure 110. In some embodiments, part or all of the inner layer 330 may be padded to provide the desired cushioning function. The nasal cushion advantageously improves comfort for the user, while also assisting to ensure a closer fit of the edges of face covering structure 110 to the face of the user.

In some embodiments, the face covering structure 110 is configured to extend from the bridge of the user's nose in use, to a base of a mental protuberance of the user in use. In other embodiments, the face covering structure 110 is configured to cover the mental protuberance or mental region of the user in use. In other embodiments, the face covering structure 110 is configured to at least partially cover the submental triangle region of the user in use. This can be seen in FIG. 7.

In some embodiments, the face covering structure further comprises a lower fabric attached to a longitudinal side of the outer fabric layer and an inner fabric layer, and distal from the nasal cushion. In this way, when in use, the lower fabric is connected to the face covering structure at an angle of more than 10°. In other embodiments, the angle is more than 15°, 20°, 25°, 30°, 35°, 40°, 50°, 60°, 70°, 80°, 90° or 100°.

Advantageously, this lower fabric acts as a flap to provide more coverage to the user. Additionally, the flap provides more contact of the face mask to the user's face, and accordingly an improved sense of security is imparted to the user.

In some embodiments, the face covering structure 110 is configured to at least partially cover the buccal region of the user's face in use. In other embodiments, the face covering structure 110 is configured to at least partially cover the zygomatic region of the user's face in use.

In some embodiments, the face covering structure further comprises two extensions each extending out from the first point on the opposed sides of the face covering structure, for attaching to the drawstring. This can be seen in FIG. 7.

Advantageously, extending the coverage of the face covering structure substantially towards the ears of the user in use provides greater assurance to the user that better protection is afforded. This also prevents (or at least reduces) the possibility of accidental removal of the face mask. Additionally, the extensions also reduces pressure of the ear straps on the ears, thus allowing for greater comfort.

In some embodiments, the outer composite fabric layer 310 is a porous fabric comprising cotton and spandex, wherein the cotton relative to the fabric is about 90% w/w, wherein the spandex relative to the fabric is about 10% w/w.

In some embodiments, the inner fabric layer 330 is a quick dry fabric. As used herein, 'quick dry fabric' refers to a fabric that dries quickly. In this regard, the quick dry fabric dries about 1.35 times faster than untreated fabric. For example, the quick dry property can be provided by a chemical coating that can enhance the speed it takes to dry fabric. Examples of quick dry fabrics include nylon, polyester, merino wool, cotton and a blend of cotton and polyester fabric.

In some embodiments, the filter layer 320 is a non woven filter layer. In some embodiments, the filter layer 320 is a non woven fabric filter layer. Non-woven fabrics are made in two main ways: they are either felted or they are bonded. The fabrics use fibres rather than yarns; these are laid randomly or in a uniform way to make web-like layers. Nonwoven fabric is a fabric-like material made from staple fibre (short) and long fibres (continuous long), and can be bonded together by chemical, mechanical, heat or solvent treatment.

Examples of non woven filter layer include charcoal fabric, bamboo fabric and melt blown polypropylene. The melt blown polypropylene can further comprise charcoal, bamboo or a nano material to improve the filtration efficiency. Polytetrafluoroethylene (PTFE) membrane can also be used as it can withstand better wear and tear and submersion in water.

In some embodiments, the filter layer 320 has a pore size of less than 2.5 µm. In other embodiments, the filter layer 320 has a pore size of less than 2 µm, 1.5 µm, 1 µm, 0.8 µm, 0.5 µm, or 0.1 µm. In other embodiments, the filter layer 320 is capable of filtering particles with a particle size of more than 1 µm. In other embodiments, the filter layer 320 is capable of filtering particles with a particle size of more than 0.9 µm, 0.8 µm, 0.7 µm, 0.6 µm, 0.5 µm, 0.4 µm, 0.3 µm, 0.2 µm, or 0.1 µm.

In some embodiments, the filter layer 320 is capable of filtering particles with a size of more than 0.3 µm. In some embodiments, the filtration efficiency is at least about 60%, about 65%, about 70%, about 75%, about 80%, about 85%, about 90%, about 95%, or about 98%. In other embodiments, the filter layer 320 is capable of filtering particles with a size of more than 0.3 µm and with an efficiency of at least about 80%.

In some embodiments, the filter layer 320 is capable of filtering particles with a size of about 0.1 µm. In some embodiments, the filtration efficiency is at least about 60%, about 65%, about 70%, about 75%, about 80%, about 85%, about 90%, about 95%, or about 98%. In other embodiments, the filter layer 320 is capable of filtering particles with a size of about 0.1 μm and with an efficiency of at least about 80%.

In some embodiments, the face mask 100 has the following properties:

a) Outer Layer (310)—Fluid Resistant;

b) Antimicrobial Layer (not shown in FIG. 5, but may be provided on outer layer 310)—Antimicrobial Fabric layer for trapping and killing microbes (viruses and bacterial cells);

c) Non-active Layer (320)—Special non-woven fibre to filter out particulates; and d) Inner Layer (330)—Quick dry cooling mesh layer.

The outer layer and antimicrobial layer can be part of the outer composite fabric layer 310. The composite fabric layer can be fabricated from the composite material as disclosed herein. This provides a face mask 100 that is comfortable when used, as well as being effective in its prevention and/or halting the spread of diseases.

In some embodiments, the face mask 100 is capable of filtering particles with a particle size of more than 1 μm. In other embodiments, the face mask is capable of filtering particles with a particle size of more than 0.9 μm, 0.8 μm, 0.7 μm, 0.6 μm, 0.5 μm, 0.4 μm, 0.3 μm, or 0.2 μm.

In some embodiments, the face mask 100 has a fine particulate matter rating of 2.5 (PM$_{2.5}$). PM$_{2.5}$ refers to particulate matter which is 2.5 μm or less in diameter. PM$_{2.5}$ is generally described as fine particles. In this regard, the face mask 100 is capable of filtering particles down to 2.5 μm.

In some embodiments, the face mask 100 has a bacterial filtration efficiency of at least 90% after 30 days. In other embodiments, the bacterial filtration efficiency is at least 98%, at least 96%, at least 94%, at least 92%, at least 90%, at least 85% at least 80% at least 75% at least 70%, at least 65%, or at least 60%.

In some embodiments, the face mask 100 has an anti-bacterial efficacy of at least 90% after 24 h. In other embodiments, the anti-bacterial efficacy is at least 98%, at least 96%, at least 94%, at least 92%, at least 90%, at least 85% at least 80% at least 75% at least 70%, at least 65%, or at least 60%.

In some embodiments, the face mask 100 has an anti-viral efficacy with at least 0.5-log unit inhibition after 24 h. The efficacy can be compared against a control. In other embodiments the anti-viral inhibition is at least 1-log unit, at least 1.5-log unit, at least 2-log unit, at least 2.5-log unit, at least 3-log unit, at least 3.5-log unit, at least 14 log unit, or at least 4.5-log unit.

In some embodiments, the outer composite fabric layer 310 and the filter layer 320 are fused together. The fusion can be performed using a heat transfer fusing machine.

The composite fabric layer 310 may comprise a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; and wherein the water repellent coating has a thickness of about 10 μm to about 500 μm.

The composite fabric layer 310 of the face mask can be fabricated or cut out from a composite material.

It was envisioned that a composite material with anti-bacterial and/or anti-viral properties can be advantageous. The composite material can be used as an inner layer in a face mask (user facing side), or as an outer layer of the face mask (exposed side). The composite material can also be used as a sandwiched layer such that it is protected and/or covered by fabric at both its sides. To this end, the inventor has found that an iron-iron oxide composition when applied in a specific manner to a porous fabric material can provide protection to a user. Without wanting to be bound by theory, it is believed that this has the ability to kill viruses and bacteria on contact. When the composite material is applied as a substrate or layer to a face mask, the face mask can not only protected a user via an inhalation route, but also kill the viruses and bacteria which contact with the surface of the mask.

It is postulated that the composite material will trap the microbes by mimicking the sites on human cells to which they normally attach, and then destroy them by disrupting their surfaces (viruses) and cell walls (bacteria). It was found that the composite material can kill germs which can cause Influenza A, Bird Flu, SARS, measles, pneumonia, common colds, tuberculosis, herpes, MRSA and gastroenteritis.

The anti-bacterial activity is believed to be via a mechanism in which proteins of microbial membranes can be bound to the composite material, which damages the bacterial cell's structure and function. Further complexation with essential metal ions also inhibits fibrin formation.

Figure 13:
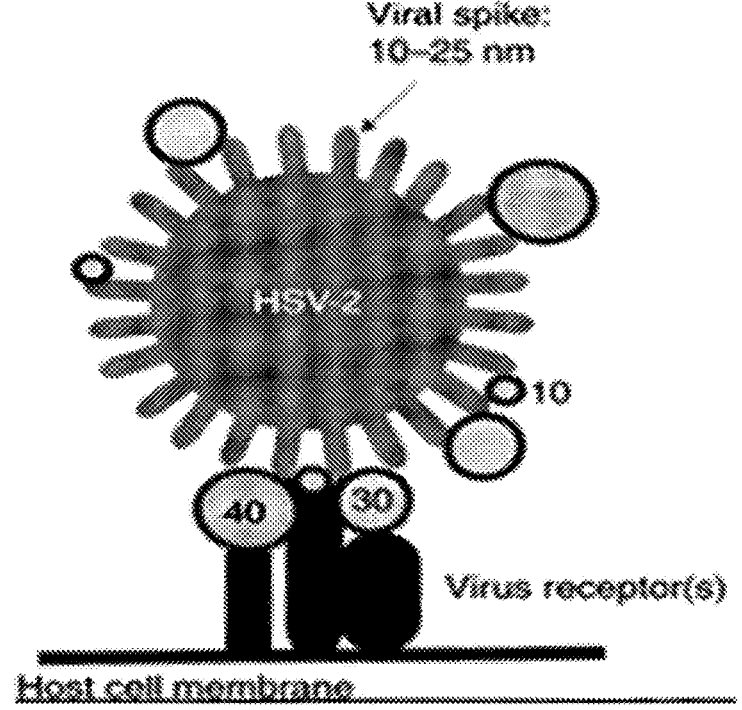
FIG. 13 illustrates a schematic of a hypothetical interaction of inhibiting a virus.

Further, anti-viral activity can also be effected. The composite material can attack different stages of the viral replication process. This includes the extracellular virions themselves, during the attachment of the virus to the cell (FIG. 13), during the penetration of the virus into the cell, during the viral replication process in the host cell, as well during the assembly of new viral particles, transport proteins, polysaccharides, and viral enzymes. In almost all of the abovementioned stages, the composite will bind permanently to the proteins of the capsid or supercapside. The proteins may be either the specific viral enzymes required for viral replication or to the newly synthesized viral proteins that are involved in the production of the new viral particle.

Microbial infections and the development of antimicrobial resistance have received attention as one of the most critical issues facing the public health and security. The creation of clean antimicrobial surfaces with long-term stabilities and activities have tremendous applications involving almost all aspects of our daily life, such as medical devices, hospital surfaces, textiles, packaging, electrical appliances, marine antifouling, filters and public surfaces. Inorganic antimicrobial materials, especially semiconductor antimicrobial materials are less prone to chemical contamination and possess long-term stability. Some metal or metal oxides, such as silver, zinc oxide and titanium oxide particles have been used as antimicrobial ingredients in various products or in antimicrobial surface coatings. However, these materials also have limitations such as heavy metal contamination/toxicity (for Ag based materials). For ZnO and TiO$_2$ materials, they suffer from low anti-microbial efficacies and limited applications, due to the dependence on photo irradiation. In addition, uncertainty nano-toxicity is another concern for nano-size materials.

Advantageously, the inventors have found that an iron based antimicrobial material is non-toxic, yet can be highly active against microbes, very stable and has long-term activity. For example, the iron-iron oxide composition can be synthesized by modifying iron powder (microns size) with carbohydrates, amino acids, food additives or nutrition, under non organic solvent conditions. This can be done, for example, using a fluidised bed reactor.

Iron powder is redox active, it will slowly react with oxygen and moisture to form iron oxides and releasing hydrogen. Iron powder itself will not generate reactive oxygen species (ROS) and does not kill bacteria. There could be some iron cation releasing out from iron powder, but it is in very low concentration and not harmful to cells.

Advantageously, by modifying iron powder (microns size) with carbohydrates, amino acids, food additives or nutrition, the iron particles can have a nano-structured protection shell covered the iron core. This shell can be formed by the reaction of iron with carbohydrates, amino acids, food additives under non organic solvent conditions.

The core-shell structure creates a special interface between iron core and iron complex shell which changes the potential of iron core and the redox reaction pathway. Accordingly, the iron particles can react with oxygen and moisture to generate ROS. Iron oxides and hydroxides are kept in the core part. In this way, the iron particles can generate different ROS which include super oxide, singlet oxygen and hydroxyl radical. ROS can then kill contacted bacteria and virus. The ROS killing mechanism of the material is similar to photo catalyst materials, such as ZnO and $TiO_2$. The ROS generation mechanism of this material is different from those photo catalyst materials. It is self-catalysed materials, it does not rely on photo irradiation to generate ROS. The iron particles sacrifices iron core to generate ROS.

Accordingly, the present invention also provides a composite material, comprising a porous fabric impregnated with an iron-iron oxide composition and coated with a water repellent coating on at least one side of the porous fabric, wherein the iron-iron oxide composition is present relative to the composite material at about 0.1% w/w to about 5% w/w;

wherein the water repellent coating has a thickness of about 10 μm to about 500 μm.

It should be appreciated that in relation to the composite material, its main use is to produce a face mask. Advantageously, the composite material and/or face mask 100 provides protection against the inhalation or transmission of viruses and/or bacterial cells. The composite material and/or face mask 100 also acts to kill the viruses and bacterial cells which are in contact with the composite layer 310 of the face mask 100. Further advantageously, as the iron-iron oxide composition is retained in the composite material, the face mask is re-usable, even after washing for 20 times. In this regard, at least 70% of the iron-iron oxide composition is retained in the composite fabric layer after washing for 20 times.

As used herein, 'composite material' is a material made from two or more constituent materials with significantly different physical or chemical properties that, when combined, produce a material with characteristics different from the individual components. The individual components remain separate and distinct within the finished structure. In this regard, the presently disclosed composite material has an ability to kill viruses and bacteria, and can be washable for at least 30 times.

As used herein, 'impregnate' means to soak or saturate (something) with a substance. In this regard, the porous fabric is soaked with the iron-iron oxide composition.

In some embodiments, the iron-iron oxide composition is impregnated/present relative to the composite material at about 0.1% w/w to about 5% w/w. In this regard, the dry mass of the iron-iron oxide composition in relation to the final composite material dry mass is about 0.1% w/w to about 5% w/w. In other embodiments, the impregnation is at about 0.1% w/w to about 4% w/w, at about 0.1% w/w to about 3% w/w, at about 0.1% w/w to about 2% w/w, at about 0.1% w/w to about 1% w/w, or at about 0.1% w/w to about 0.5% w/w. In other embodiments, the impregnation is less than 5% w/w, less than 4% w/w, less than 3% w/w, less than 2% w/w, less than 1% w/w, less than 0.5% w/w, or less than 0.2% w/w.

Advantageously, the impregnation of the iron-iron oxide composition in the porous fabric allows for a homogenous dispersion of the iron particles in the composite material. In this regard, the iron-iron oxide composition is retained in the composite material. When used to form a face mask 100, when in use, moisture or water vapour from a user's mouth pass through the porous fabric, and accordingly can 'activate' the iron particles.

The iron, in the presence of oxygen and water, is converted to iron oxide and in the process releases ROS. In this regard, a reservoir of ROS is constantly available when the face mask is in use.

In some embodiments, the iron-iron oxide composition comprises iron, iron (II) oxide and iron (III) oxide. In some embodiments, the iron relative to the iron-iron oxide composition is at more than 90% w/w. In other embodiments, the iron relative to the iron-iron oxide composition is at more than 91% w/w, more than 92% w/w, more than 93% w/w, more than 94% w/w, more than 95% w/w, more than 96% w/w, or more than 97% w/w. In other embodiments, the iron (II) oxide and iron (III) oxide relative to the iron-iron oxide composition is at less than 10% w/w. In other embodiments, the iron (II) oxide and iron (III) oxide relative to the iron-iron oxide composition is at less than 9% w/w, at less than 8% w/w, at less than 7% w/w, at less than 6% w/w, at less than 5% w/w, at less than 4% w/w, or at less than 3% w/w.

In some embodiments, the iron is elemental iron. In other embodiments, the iron (II) oxide is FeO. In other embodiments, the iron (II) oxide is $Fe_2O_3$. In other embodiments, the iron (II) oxide and iron (III) oxide is $Fe_3O_4$. In this regard, the iron-iron oxide composition can be a mixture of Fe, FeO, $Fe_2O_3$ and $Fe_3O_4$.

In other embodiments, the iron-iron oxide composition further comprises a carbohydrate. In some embodiments, the carbohydrate relative to the iron-iron oxide composition is at about 2% w/w to about 6% w/w. In other embodiments, the carbohydrate relative to the iron-iron oxide composition is at about 2% w/w to about 5% w/w, or about 3% w/w to about 5% w/w. In some embodiments, the carbohydrate relative to the iron-iron oxide composition is at about 2% w/w to about 20% w/w.

The carbohydrate can be selected from monosaccharide, disaccharide, oligosaccharide, and polysaccharide. Examples of carbohydrate are, but not limited to, glucose, galactose, fructose, xylose, sucrose, lactose, maltose, trehalose, sorbitol, mannitol, maltodextrin, raffinose, stachyose, fructo-oligosaccharide, amylose, amylopectin, modified starch, glycogen, dextran, chitosan, glycosaminoglycans, alginate, ulvan, gum Arabic, gellan gum, cellulose, hemicellulose, ethylcellulose, methylcellulose, pectin, hydrocolloid and a combination thereof.

In some embodiments, the iron-iron oxide composition comprises iron, $Fe_3O_4$ and a carbohydrate. In some embodiments, the iron relative to the iron-iron oxide composition is at more than 95% w/w, the $Fe_3O_4$ relative to the iron-iron oxide composition is at less than 2% w/w, and the carbohydrate relative to the iron-iron oxide composition is at about 3% w/w to about 5% w/w.

In other embodiments, the iron-iron oxide composition further comprises an amino acid. In some embodiments, the amino acid relative to the iron-iron oxide composition is at about 2% w/w to about 6% w/w. In other embodiments, the amino acid relative to the iron-iron oxide composition is at about 2% w/w to about 5% w/w, or about 3% w/w to about 5% w/w.

In the context of this specification, the term "amino acid" is defined as having at least one primary, secondary, tertiary or quaternary amino group, and at least one acid group, wherein the acid group may be a carboxylic, sulfonic, or phosphonic acid, or mixtures thereof. The amino groups may be "alpha", "beta", "gamma" . . . to "omega" with respect to the acid group(s). The backbone of the "amino acid" may be substituted with one or more groups selected from halogen, hydroxy, guanido, heterocyclic groups. Thus term "amino acids" also includes within its scope glycine, alanine, valine, leucine, isoleucine, methionine, proline, phenylalanine, tryptophane, serine, threonine, cysteine, tyrosine, asparagine, aspartic acid, glutamine, glutamic acid, lysine, arginine, histidine, taurine, betaine, N-methylalanine, etc. (L) and (D) forms of amino acids are included in the scope of the present disclosure.

In some embodiments, the iron-iron oxide composition comprises iron, $Fe_3O_4$ and an amino acid. In some embodiments, the iron relative to the iron-iron oxide composition is at more than 95% w/w, the $Fe_3O_4$ relative to the iron-iron oxide composition is at less than 2% w/w, and the amino acid relative to the iron-iron oxide composition is at about 3% w/w to about 5% w/w.

In other embodiments, the iron-iron oxide composition further comprises an amino acid, carbohydrate or a mixture thereof. In some embodiments, the amino acid, carbohydrate or a mixture thereof relative to the iron-iron oxide composition is at about 2% w/w to about 6% w/w. In other embodiments, the amino acid, carbohydrate or a mixture thereof relative to the iron-iron oxide composition is at about 2% w/w to about 5% w/w, or about 3% w/w to about 5% w/w. For example, a mixture of methylcellulose and zein can be used.

In some embodiments, the iron-iron oxide composition comprises iron, $Fe_3O_4$, and amino acid, carbohydrate or a mixture thereof. In some embodiments, the iron relative to the iron-iron oxide composition is at more than 95% w/w, the $Fe_3O_4$ relative to the iron-iron oxide composition is at less than 2% w/w, and the amino acid, carbohydrate or a mixture thereof relative to the iron-iron oxide composition is at about 3% w/w to about 5% w/w.

In some embodiments, the iron-iron oxide composition is provided as a powder with a particle size of about 1 μm to about 100 μm. In some embodiments, the iron-iron oxide composition has a particle size of about 1 μm to about 800 μm. In this regard, the iron-iron oxide can be micron sized particles. In other embodiments, the particle size is about 1 μm to about 700 μm, about 1 μm to about 600 μm, about 1 μm to about 500 μm, about 1 μm to about 400 μm, about 1 μm to about 300 μm, about 1 μm to about 200 μm, about 1 μm to about 100 μm, about 1 μm to about 90 μm, about 1 μm to about 80 μm, about 1 μm to about 70 μm, about 1 μm to about 60 μm, about 1 μm to about 50 μm, about 1 μm to about 50 μm, about 1 μm to about 40 μm, about 1 μm to about 30 μm, or about 10 μm to about 40 μm.

In some embodiments, the iron-iron oxide composition is a plurality of micron sized particles. For example, the particles can have an iron core, which can be encapsulated with a shell. In some embodiments, the shell comprises an amino acid, carbohydrate or a mixture thereof. In some embodiments, the shell comprises an amino acid. In some embodiments, the shell comprises a carbohydrate.

Amino acids can be used as encapsulation materials. In such examples, the amino acids can be polymerised into a peptide. Peptides can also be used as encapsulation materials. Such are also included within the definition of 'amino acid'. For example, zein can be used.

Similarly to carbohydrates, when monosaccharides and/or disaccharides are used, these saccharides can be polymerised during the encapsulation process. Longer chain biopolymer can result, which creates a shell around the particle. Accordingly, monosaccharides, disaccharides, oligosaccharides and polysaccharides are included within the definition of 'carbohydrate'. For example, cyclodextrins can be used.

In some embodiments, the iron-iron oxide composition is a plurality of iron core-shell micron sized particles, wherein the core comprises Fe and the shell comprises an amino acid. In other embodiments, the iron-iron oxide composition is a plurality of iron core-shell micron sized particles, wherein the core comprises Fe, the shell comprises an amino acid, and an interface between the core and the shell comprises iron oxide. In other embodiments, the shell comprises an amino acid and iron oxide. In some embodiments, the iron oxide is $Fe_3O_4$. In some embodiments, the amino acid is selected from glycine, alanine, valine, leucine, isoleucine, methionine, proline, phenylalanine, tryptophane, serine, threonine, cysteine, tyrosine, asparagine, aspartic acid, glutamine, glutamic acid, lysine, arginine, histidine, taurine, betaine, N-methylalanine or a combination thereof.

Advantageously, when the iron particles are encapsulated with a shell, the iron core can be protected by an encapsulation shell material comprising the amino acid and/or carbohydrate. This may further delays the formation of iron oxide and hence the production of ROS until its use in the face mask. This prevents or reduces over oxidation of iron particles, and thus allows for a longer shelf life of the face mask and/or create a further persistence ROS over a longer period of time. Further, the amino acid and/or carbohydrate encapsulation material can change the potential of iron core and change the redox reaction pathway. For example, the iron oxide generated can form an interface layer between the shell and the Fe core. This allows the generation and release of ROS to be controlled. In this way, the shell on the iron particles controls the rate of iron oxidation, such that a constant release of ROS is available, which is sufficient for the anti-bacterial and/or anti-viral effect. This improves its suitability for multiple uses, allowing for additional washing. A further advantage is that as a natural compound such as a biopolymer is used to encapsulate the iron particle, the biodegradable nature of the biopolymer causes the shell to break down over time. For example, the shell can be broken down over time after multiple washing. This provides an additional anti-microbial and/or anti-viral persistence effect, as the previously less accessible inner iron core can now be more easily accessed.

In some embodiments, the shell has a thickness of about 50 nm to about 400 nm. In other embodiments, the thickness is of about 50 nm to 350 nm, about 50 nm to about 300 nm, about 100 nm to about 300 nm, about 150 nm to about 300 nm, or about 200 nm to about 300 nm.

The shell can further comprise iron. In this regard, in some embodiments, the shell comprises iron and an amino acid, carbohydrate or a mixture thereof. Advantageously, as the iron is closer to the surface of the particles, the presence of iron in the shell can 'kick starts' the oxidation of iron to iron oxide. In this sense, a burst release of ROS is provided at first instance, which can provide protection to a user when the face mask is first used and before sufficient water is provided as moisture to the iron core.

In some embodiments, the iron-iron oxide composition is a plurality of iron core-shell micron sized particles, wherein the core comprises Fe and the shell comprises Fe and an amino acid. In other embodiments, the iron-iron oxide composition is a plurality of iron core-shell micron sized particles, wherein the core comprises Fe, the shell comprises Fe and an amino acid, and an interface between the core and the shell comprises iron oxide. In some embodiments, the iron oxide is $Fe_3O_4$. In some embodiments, the amino acid is selected from glycine, alanine, valine, leucine, isoleucine, methionine, proline, phenylalanine, tryptophan, serine, threonine, cysteine, tyrosine, asparagine, aspartic acid, glutamine, glutamic acid, lysine, arginine, histidine, taurine, betaine, N-methylalanine or a combination thereof.

Advantageously, the shell comprising an amino acid provides for better retention of the iron-iron oxide composition on the surface of the fabric. In this regard, the composite fabric can be washed several times and still retain its desired functionality.

As used herein, a 'porous' material refers to a material containing pores (voids). The skeletal portion of the material is often called the "matrix" or "frame". The pores are typically filled with a fluid (liquid or gas). The skeletal material is usually a solid or a foam. In the present context, the porous fabric are "breathable" fabric in that it allow air to freely pass through. This can be due to the fabric being of a loosely woven texture, or can be a non-woven texture but allows for the absorption of a fluid. Examples of porous fabric can be cotton, wool and silk. In contrast, non-porous materials retard fluid absorption: air is not able to pass freely through tightly bonded non-porous materials; plastics used for fluid or food containers are very non-porous. A porous medium is most often characterised by its porosity.

Fabric porosity can be defined as the ratio of the nonsolid volume (voids) to the total volume of fabric, and the volume fraction of solid material is defined as the ratio of solid fibre materials to the total volume of fabric. While the fibre density is the weight of a given volume of the fibre solids only (i.e. not containing other materials), the porosity can be calculated as follows by using the fabric bulk density and the fibre density:

$$\varphi\,(\%) = \frac{\rho_{fabric}}{\rho_{fibre}} \times 100\%$$

$$P\,(\%) = (1 - \varphi) \times 100\%$$

where P is the fabric porosity (%), $\varphi$ is the volume fraction of solid material (%), $\rho_{fabric}$ (kg/m$^3$) is the fabric bulk density, and $\rho_{fibre}$ (kg/m$^3$) is the fibre density.

In some embodiments, the porosity of the porous fabric is about 95%, about 90%, about 85%, about 80%, about 75%, about 70%, about 65%, or about 60%.

In some embodiments, the porous fabric of the composite material is a knitted porous fabric. Knitted fabric is a textile that results from knitting. Its properties are distinct from woven fabric in that it is more flexible and can be more readily constructed into smaller pieces. In some embodiments, the porous fabric of the composite material is a woven porous fabric. Woven fabric is any textile formed by weaving. Woven fabrics are often created on a loom, and made of many threads woven on a warp and a weft. Technically, a woven fabric is any fabric made by interlacing two or more threads at right angles to one another.

In some embodiments, the knitted porous fabric is selected from Jersey, ponte, ribbing, sweat shirting fleece, interlock knit, spandex, double knit, polar fleece and French terry knit fabric.

In some embodiments, the porous fabric of the composite material is a fabric comprising cotton and spandex. In some embodiments, the cotton relative to the fabric is about 95% w/w, about 90% w/w, about 85% w/w, about 80% w/w, about 75% w/w, about 70% w/w, about 650% w/w, or about 60% w/w. In other embodiments, the spandex relative to the fabric is about 10% w/w. In other embodiments, the spandex relative to the fabric is about 5% w/w, about 15% w/w, about 20% w/w, about 25% w/w, about 30% w/w, about 35% w/w, or about 40% w/w.

In some embodiments, the porous fabric of the composite material is a fabric comprising 90% w/w cotton and 10% w/w spandex.

Spandex, Lycra or elastane is a synthetic fiber known for its exceptional elasticity. It is a polyether-polyurea copolymer.

Advantageously, the use of spandex allows for the ease of forming the composite material. As is disclosed herein, when forming the composite material, it is slightly stretched. The stretching was found to facilitate the impregnation of the iron-iron oxide composition in the fabric. Further, the use of spandex allows for the ease of cutting the composite material for forming the mask.

The water repellent coating can provide a lotus leaf effect on the composite material, and thus on the face mask made therefrom. In nature, lotus leaves have unprecedented capability of rolling of water droplets off its surface by virtue of 'super-hydrophobicity'. The fine architecture on the leaf surface, which results from the coexistence of micro-sized papillae (10-20 µm in height and 10-15 µm in width), nanoscale hair-like structures and a hydrophobic waxy cover all over, physically minimizes the droplet's adhesion to that surface. To this end, the inventor has developed several fabric finishes in order to mimic the 'lotus effect' and achieving high water repellency along with 'self-cleaning' attributes. As the water drops rolls off such highly water repellent surfaces, the dirt particles and other impurities on the surface are 'carried along'. The chemistry is as follows:

C6 Chemistry—PFHA (perfluorohexanoic acid; C6) with backbone of 6 carbon atoms, is supposed to be 40 times less bio-accumulative than perfluorooctanoic acid (PFOA; C8; the 8-carbon counterpart). But it is also less effective, so more of the chemical has to be used to achieve the same result. Additionally, the recipe also involved small traces of C8 molecules. At present, C6 technology is most prevalent in textile industry although a growing number of sustainability conscious brands are phasing out the use of such chemicals in their products.

Fluorine-free Chemistries: Although products with no PFOA and Perfluorooctanesulfonic acid (PFOS) claim to be fluorine-free DWR products, there are products available or being tried that involve completely different chemistries. Paraffin (and other hydrocarbon based solutions), silica nanoparticles and silanes (e.g. alkyl trialkoxy silanes) are some tested examples.

Advantageously, the water repellent coating allows the composite material to be washable and not loss its antibacterial and anti-viral properties. In this regard, the coating prevents or at least reduces the loss of the iron-iron oxide composition from the fabric. Further advantageously, the composite material can be used as an outer layer (interfacing with the environment), and accordingly reduce the number of layers required to form a mask but at the same time retain the same, if not better, level of protection.

Additionally, the water repellent coating prevents or reduces the oxidation of the iron particles during washing. As mentioned herein, iron is oxidised to iron oxide in the presence of water and oxygen. It was advantageously found that the water repellent coating can further provide protection to the iron-iron oxide composition, by acting synergistically with the shell on the iron particle. In this regard, better control over the release of ROS can be achieved.

In some embodiments, the water repellent coating is selected from perfluorobutanesulfonic acid, perfluorooctanoic acid, perfluorohexanoic acid, Scotchgard, perfluorooctanesulfonic acid, paraffin (and other hydrocarbon based solutions), silica nanoparticles and silanes (e.g. alkyl trialkoxy silanes).

In some embodiments, the water repellent coating is on one side of the porous fabric. When coated on one side of the porous fabric, the coating can be on the side that is impregnated with iron-iron oxide composition. In some embodiments, the water repellent coating is on at least one side of the porous fabric. In other embodiments, the water repellent coating is on both sides of the porous fabric.

In some embodiments, the water repellent coating has a thickness of about 1 μm to about 1000 μm. In other embodiments, the thickness is of about 1 μm to about 900 μm, about 1 μm to about 800 μm, about 1 μm to about 700 μm, about 1 μm to about 600 μm, about 1 μm to about 500 μm, about 1 μm to about 400 μm, about 1 μm to about 300 μm, about 1 μm to about 200 μm, or about 1 μm to about 100 μm. In other embodiments, the thickness is of about 10 μm to about 1000 μm, about 10 μm to about 900 μm, about 10 μm to about 800 μm, about 10 μm to about 700 μm, about 10 μm to about 600 μm, about 10 μm to about 500 μm, about 10 μm to about 400 μm, about 10 μm to about 300 μm, about 10 μm to about 200 μm, or about 10 μm to about 100 μm.

In some embodiments, at least 70% of the iron-iron oxide composition is retained in the composite material after washing for 20 times. In some embodiments, at least 75%, at least 80%, at least 85%, at least 90%, or at least 95% of the iron-iron oxide composition is retained. In other embodiments, the composite material is washable for at least 10 times, at least 15 times, at least 20 times, at least 25 times or at least 30 times.

As will be discussed below, the carbohydrate, amino acid, or mixture thereof can be provided by a cashew testa extract. Other components such as proteins, sugars, tannic acid and phenolic compounds can also be present in the cashew testa extract and can form part of the iron-iron oxide composition. Additionally, in some embodiments, the composite material further comprises a second coating, the second coating formed from an extract obtained from cashew testa. This can be in addition to the cashew testa extract which is present in the iron-iron oxide composition.

Advantageously, the cashew testa extract coating provides an additional protective layer further to the iron-iron oxide composition. Cashew testa extract contains many polyphenols, including tannic acid. Tannic acid is a water soluble and reddish brown coloured molecule. It can have anti-cancer and anti-mutagenic properties due to its high anti-oxidant and anti-inflammatory activity. The antimicrobial property of tannic acid can also be effective against the growth of many fungi, yeasts, gram positive bacteria such as *Staphylococcus aureus* and viruses (noroviruses, the influenza A virus, and papilloma viruses) by the anti-bacterial and anti-viral mechanisms as disclosed herein.

Advantageously, as cashew nut (*Anacardium occidentale*) is a major crop in the world and the testa (reddish brown skin) is usually discarded as waste due to its bitter and astringent taste, the testa can be collected at low cost and extracted. This extract can possess anti-bacterial properties against gram negative bacteria *Escherichia coli* and gram positive bacteria *Staphylococcus aureus*. It also has anti-cancer properties against the human liver cancer cells HEPG2. It is advantageous to use these discarded material to synthesis an anti-microbial composition as the production cost is low and it is also environmentally green and friendly.

In some embodiments, the cashew testa extract coating has a thickness of about 10 μm to about 1000 μm. In other embodiments, the thickness is of about 10 μm to about 900 μm, about 10 μm to about 800 μm, about 10 μm to about 700 μm, about 10 μm to about 600 μm, about 10 μm to about 500 μm, about 10 μm to about 400 μm, about 10 μm to about 300 μm, about 10 μm to about 200 μm, or about 10 μm to about 100 μm.

In some embodiments, the cashew testa extract coating is coated on one side of the composite material. In other embodiments, the cashew testa extract coating is coated on at least one side of the composite material. In other embodiments, the cashew testa extract coating is coated on both sides of the composite material.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 1% w/w; wherein the water repellent coating has a thickness of about 10 μm to about 500 μm.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the water repellent coating has a thickness of about 10 μm to about 500 μm; and wherein the water repellent coating is selected from perfluorooctanoic acid, perfluorohexanoic acid, paraffin, silica nanoparticles and silanes (e.g. alkyl trialkoxy silanes).

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the water repellent coating has a thickness of about 10 μm to about 500 μm; and wherein the porous fabric is a fabric comprising 90% w/w cotton and 10% w/w spandex.

In some embodiments, the composite material comprises: a porous fabric impregnated with an iron-iron oxide composition and coated with a water repellent coating on at least one side of the porous fabric, herein the iron-iron oxide composition is impregnated relative to the composite material at about 0.1% w/w to about 5% w/w; wherein the water repellent coating has a thickness of about 10 μm to about 500 μm; wherein the water repellent coating is selected from perfluorooctanoic acid, perfluorohexanoic acid, paraffin, silica nanoparticles and silanes (e.g. alkyl trialkoxy silanes); and wherein the porous fabric is a fabric comprising 90% w/w cotton and 10% w/w spandex.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the iron-iron oxide composition comprises iron, $Fe_3O_4$ and carbohydrate, the iron relative to the iron-iron oxide composition is at more than 95% w/w, the $Fe_3O_4$ relative to the iron-iron oxide composition is at less than 2% w/w, and the carbohydrate relative to the iron-iron oxide composition is at about 3% w/w to about 5% w/w; wherein the water repellent coating has a thickness of about 10 μm to about 500 μm; and wherein the porous fabric is a fabric comprising 90% w/w cotton and 10% w/w spandex.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the iron-iron oxide composition comprises iron, $Fe_3O_4$ and amino acid, the iron relative to the iron-iron oxide composition is at more than 95% w/w, the $Fe_3O_4$ relative to the iron-iron oxide composition is at less than 2% w/w, and the amino acid relative to the iron-iron oxide composition is at about 3% w/w to about 5% w/w; wherein the water repellent coating has a thickness of about 10 μm to about 500 μm; and wherein the porous fabric is a fabric comprising 90% w/w cotton and 10% w/w spandex.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the iron-iron oxide composition comprises iron, $Fe_3O_4$, and amino acid, carbohydrate or a mixture thereof, the iron relative to the iron-iron oxide composition is at more than 95% w/w, the $Fe_3O_4$ relative to the iron-iron oxide composition is at less than 2% w/w, and the amino acid, carbohydrate or a mixture thereof relative to the iron-iron oxide composition is at about 3% w/w to about 5% w/w; wherein the water repellent coating has a thickness of about 10 μm to about 500 μm; and wherein the porous fabric is a fabric comprising 90% w/w cotton and 10% w/w spandex.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the iron-iron oxide composition comprises iron, $Fe_3O_4$, and amino acid, carbohydrate or a mixture thereof, the iron relative to the iron-iron oxide composition is at more than 95% w/w, the $Fe_3O_4$ relative to the iron-iron oxide composition is at less than 2% w/w, and the amino acid, carbohydrate or a mixture thereof relative to the iron-iron oxide composition is at about 3% w/w to about 5% w/w; wherein the iron-iron oxide composition is provided as a powder with a particle size of about 1 μm to about 100 μm; wherein the water repellent coating has a thickness of about 10 μm to about 500 μm; and wherein the porous fabric is a fabric comprising 90% w/w cotton and 10% w/w spandex.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the iron-iron oxide composition comprises iron, $Fe_3O_4$, and amino acid, carbohydrate or a mixture thereof, the iron relative to the iron-iron oxide composition is at more than 95% w/w, the $Fe_3O_4$ relative to the iron-iron oxide composition is at less than 2% w/w, and the amino acid, carbohydrate or a mixture thereof relative to the iron-iron oxide composition is at about 3% w/w to about 5% w/w; wherein the iron-iron oxide composition is provided as a powder with a particle size of about 1 μm to about 100 μm; wherein the particles comprises an iron core, a shell and an interface between the core and the shell, wherein the shell comprising an amino acid, carbohydrate or a mixture thereof, and wherein the interface comprises iron oxide; wherein the water repellent coating has a thickness of about 10 μm to about 500 μm; and wherein the porous fabric is a fabric comprising 90% w/w cotton and 10% w/w spandex.

In some embodiments, the composite material comprises: a porous fabric impregnated with an iron-iron oxide composition and coated with a water repellent coating on at least one side of the porous fabric, wherein the iron-iron oxide composition is impregnated relative to the composite material at about 0.1% w/w to about 5% w/w; wherein the iron-iron oxide composition comprises iron, $Fe_3O_4$, and amino acid, carbohydrate or a mixture thereof, the iron relative to the iron-iron oxide composition is at more than 95% w/w, the $Fe_3O_4$ relative to the iron-iron oxide composition is at less than 2% w/w, and the amino acid, carbohydrate or a mixture thereof relative to the iron-iron oxide composition is at about 3% w/w to about 5% w/w; wherein the iron-iron oxide composition is provided as a powder with a particle size of about 1 μm to about 100 μm; wherein the particles comprise an iron core, a shell and an interface between the core and the shell, wherein the shell comprising an amino acid, carbohydrate or a mixture thereof, and wherein the interface comprises iron oxide; wherein the shell has a thickness of about 50 nm to about 400 nm; wherein the water repellent coating has a thickness of about 10 μm to about 500 μm; and wherein the porous fabric is a fabric comprising 90% w/w cotton and 10% w/w spandex.

Figure 9:
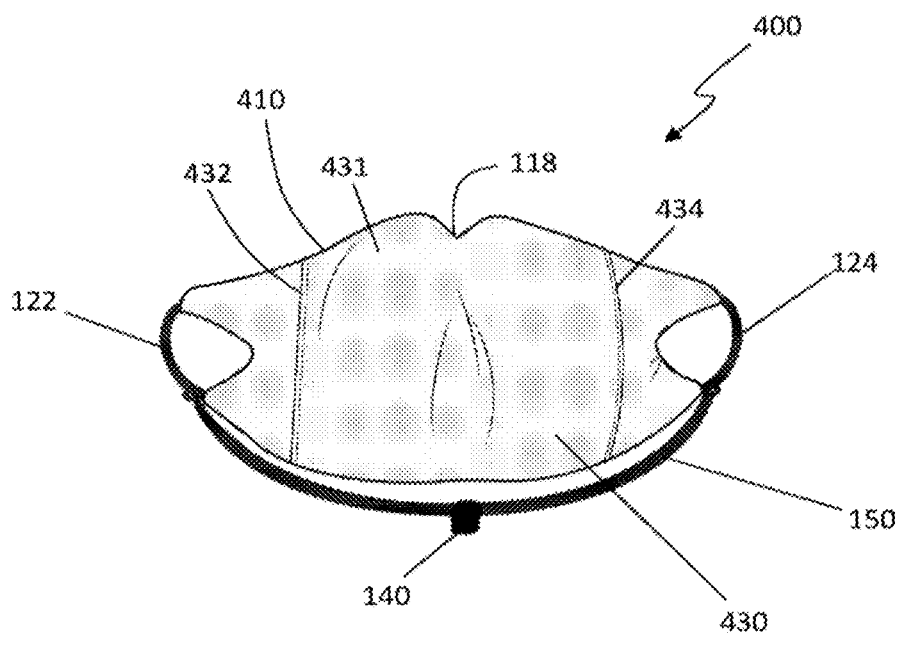
FIG. 9 is a rear view of another example of a face mask according to certain embodiments.
Figure 10:
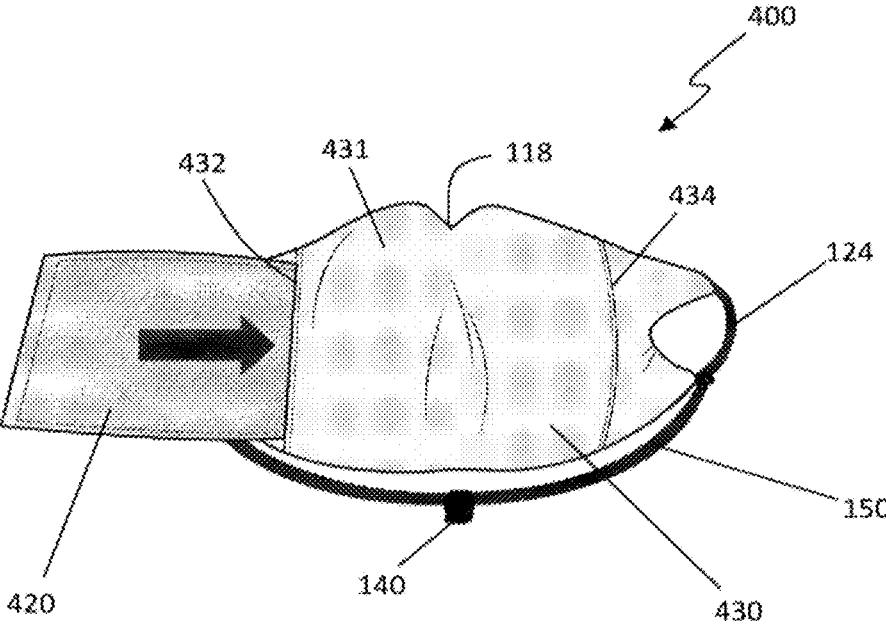
FIG. 10 shows a replaceable filter layer being inserted into the face mask of FIG. 9.
Figure 11:
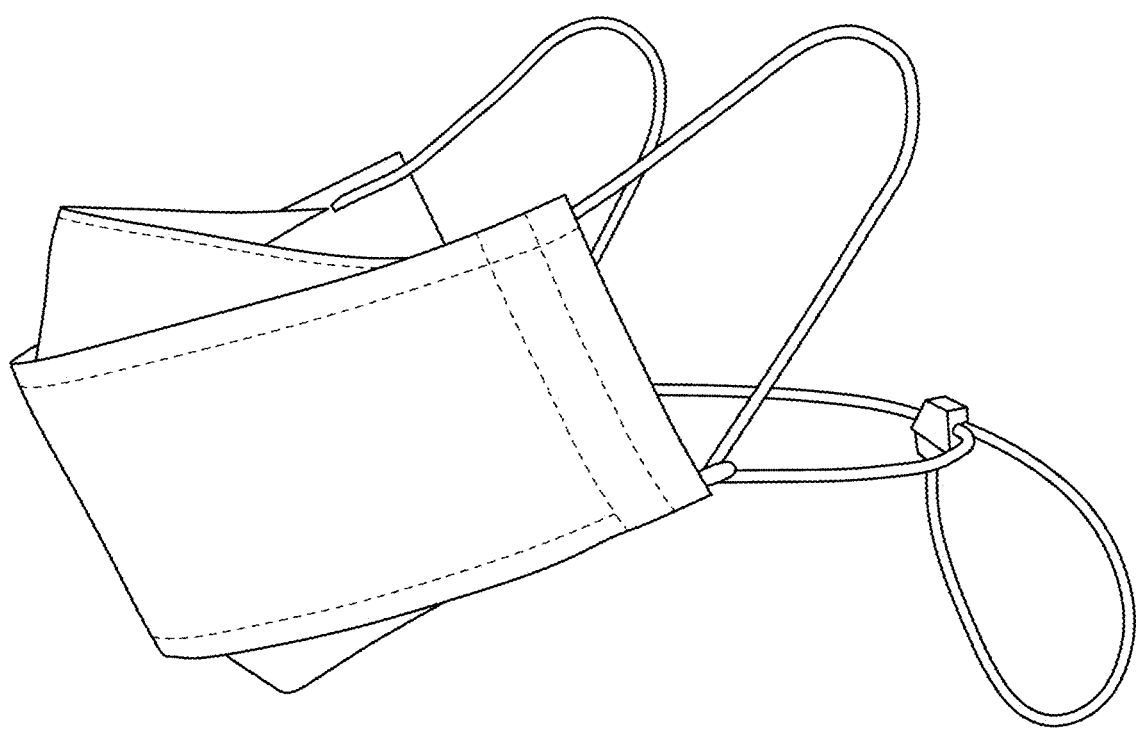
FIG. 11 is an isometric view of another face mask according to certain embodiments.
Figure 12:
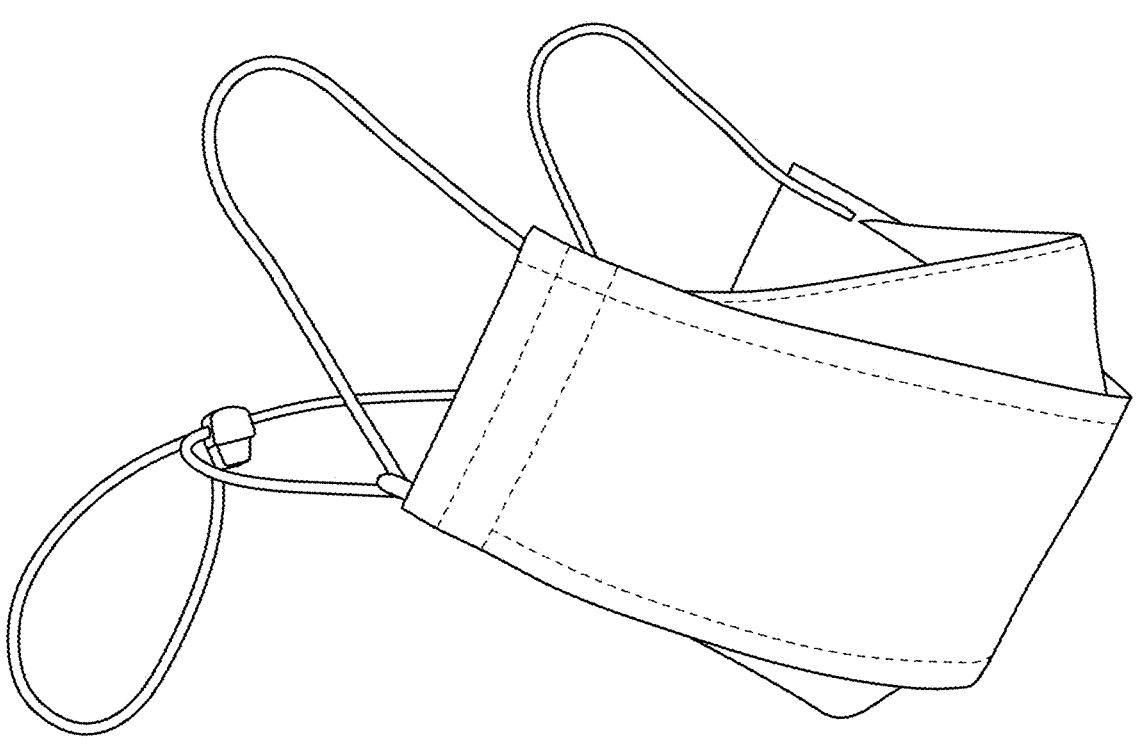
FIG. 12 right side view of the face mask.

Referring now to FIGS. 9 and 10, a further example of a face mask 400 is shown. The face mask 400 is substantially of the same form as face mask 100, though has a different inner layer 430. In particular, the inner layer 430 of mask 400 may be provided with a pocket or sleeve 431 to receive a replaceable filter layer 420 in the manner shown in FIG. 10. For example, the sleeve 431 may be provided by stitching or otherwise affixing the inner layer 430, at or near one end of inner layer 430, to the remaining layers of the face covering portion 410 of the face mask 400 to form an end 434 of the sleeve 431. Another end of the inner layer 430 may be left unattached, or a cut 432 may be formed in the inner layer 430, to leave an opening of the sleeve 431 for insertion of the filter layer 420.

The filter layer 420 may have similar or identical physical and chemical properties to the filter layer 320 of mask 100, as described above.

Advantageously, by providing a sleeve 431 at the inner layer 430, the filter 420 can be removed prior to washing, or to replace it with another like filter at the end of its effective life (for example, once every 100 hours for ensuring the mask 400 continues to have its desired anti-viral effect).

The present invention also provides a face mask, comprising:
a body dimensioned to cover at least a user's nose and mouth when positioned against the user's face in an as-used position; wherein the body comprises:

a) an outer composite fabric layer;

b) an inner fabric layer adjacent to the outer composite fabric layer such that the inner fabric layer is positioned against the user's face in an as-used position; and c) a filter layer sandwiched between the outer composite fabric layer and inner fabric layer;

wherein the outer composite fabric layer is the composite material as disclosed herein.

The mask is designed to be worn on a wearer's face and comprises a mask body and a pair of ear straps. The mask is designed for multiple uses which can be used at least once or several times, or reusable type which can be reused by washing.

The mask body covers at least the mouth and nose (nostril) of a wearer. The pair of ear straps extend from both sides of the mask body and are designed to be hooked around wearer's ears. The ear straps are preferably formed of a stretch material so as to prevent excessive load on the ears. Further, the mask body is preferably formed of a material which is soft and comfortable to wear and has lower stretchiness than the ear straps so that the mask body lends itself to be retained in shape when the mask is worn on the face. The mask body may be planer or three-dimensional. In the case of a three-dimensional mask, it is essential for the mask body to take a three-dimensional shape at least when the mask is worn. (For example, the mask body may be designed to take a three-dimensional form when the mask is worn and to be folded into a planar form in a predetermined manner when the mask is not worn.) Therefore, the mask body may be designed to be three-dimensional not only when the mask is worn but when the mask is not worn.

The face mask not only filter out viral like particles to 0.3 μm, it also kill virus such as influenza. Most mask in the market that has claim to have antiviral properties are only for one time use. In contrast, the mask of the present invention is a fabric face mask that allowed it to be washable up to 30 times and still holds the antiviral properties and filtration properties. It is a more sustainable product than the one time use mask in the market.

In some embodiments, the face mask, comprises:

a body dimensioned to cover at least a user's nose and mouth when positioned against the user's face in an as-used position; wherein the body comprises:

a) an outer composite fabric layer;

b) an inner fabric layer adjacent to the outer composite fabric layer such that the inner fabric layer is positioned against the user's face in an as-used position; and c) a filter layer sandwiched between the outer composite fabric layer and inner fabric layer;

wherein the outer composite fabric layer is the composite material as disclosed herein;

wherein the inner fabric is a quick dry fabric selected from nylon, polyester, merino wool, cotton and a blend of cotton and polyester fabric; and wherein the filter layer is melt blown polypropylene.

In some embodiments, the face mask, comprises:

a body dimensioned to cover at least a user's nose and mouth when positioned against the user's face in an as-used position; wherein the body comprises:

a) an outer composite fabric layer;

b) an inner fabric layer adjacent to the outer composite fabric layer such that the inner fabric layer is positioned against the user's face in an as-used position; and c) a filter layer sandwiched between the outer composite fabric layer and inner fabric layer;

wherein the outer composite fabric layer is the composite material as disclosed herein;

wherein the inner fabric is a quick dry fabric selected from nylon, polyester, merino wool, cotton and a blend of cotton and polyester fabric; and wherein the filter layer is melt blown polypropylene comprising charcoal, bamboo or a nano material.

In some embodiments, the face mask, comprises:

a body dimensioned to cover at least a user's nose and mouth when positioned against the user's face in an as-used position; wherein the body comprises:

a) an outer composite fabric layer;

b) an inner fabric layer adjacent to the outer composite fabric layer such that the inner fabric layer is positioned against the user's face in an as-used position; and c) a filter layer sandwiched between the outer composite fabric layer and inner fabric layer;

wherein the outer composite fabric layer is the composite material as disclosed herein;

wherein the inner fabric is a quick dry fabric selected from nylon, polyester, merino wool, cotton and a blend of cotton and polyester fabric;

wherein the filter layer is melt blown polypropylene comprising charcoal, bamboo or a nano material; and wherein the filter layer is capable of filtering particles with a size of more than 0.3 μm and with an efficiency of at least about 80%.

The present invention also provides a method of manufacturing a composite material, comprising:

a) impregnating a porous fabric with an iron-iron oxide composition; and b) coating the porous fabric with a water repellent coating on at least one side of the porous fabric in order to form the composite material, wherein the iron-iron oxide composition is present relative to the composite material at about 0.1% w/w to about 5% w/w;

wherein the water repellent coating has a thickness of about 10 μm to about 500 μm.

In some embodiments, the impregnation step (step a) is performed using a mangle. A mangle is a mechanical laundry aid consisting of two rollers in a sturdy frame, connected by cogs, for pressing or flattening fabric.

In some embodiments, the method further comprises a step after (a) of curing the porous fabric with the iron-iron oxide composition. The curing step can be performed at more than 100° C., or at about 120° C.

In some embodiments, the coating step (step b) is performed using a stenter. A stenter is a specialist oven used in fabric processing for drying and heat treating fabric after wet processing.

In some embodiments, the method further comprises applying a second coating, the second coating formed from an extract obtained from cashew testa.

In some embodiments, the cashew testa extract coating is about 10 μm to about 500 μm thick.

The present invention also provides a method of manufacturing a face mask, comprising:

a) impregnating a porous fabric with an iron-iron oxide composition;

b) coating the porous fabric with a water repellent coating on at least one side of the porous fabric in order to form an outer composite fabric layer; and c) sewing the outer composite fabric layer, an inner fabric layer and a filter layer together in order to form a body, the inner fabric layer is adjacent to the outer composite fabric layer such that the inner fabric layer is positioned against the user's face in an as-used position, the filter layer is sandwiched between the outer composite fabric layer and inner fabric layer, the body is dimensioned to cover at least a user's nose and mouth when positioned against the user's face in an as-used position,
wherein the iron-iron oxide composition is present relative to the composite fabric layer at about 0.1% w/w to about 5% w/w;
wherein the water repellent coating has a thickness of about 10 μm to about 500 μm.

In some embodiments, the outer composite fabric layer and the filter layer are fused together. The fusion can be performed using a heat transfer fusing machine.

In some embodiments, the method further comprises forming the body into a three-dimensional form. In other embodiments, the body is formed into a shape with a concave contour.

In other embodiments, the method further comprises sewing two loops at opposite ends of the body in order to form a pair of ear straps.

In some embodiments, the method further comprises a step prior to (c) of die cutting a pattern of the face mask from the outer composite fabric layer, an inner fabric layer and a filter layer.

The inventor has found that an extract from natural product can be synergistically (or at least additively) combined to be particularly advantageous. In particular, the inventors have found that a cashew testa extract has anti-microbial efficacy. When formulated as a composition as disclosed herein, the anti-microbial efficacy can be synergistically improved. It was envisioned that a composition with anti-microbial (anti-bacterial and/or anti-viral) properties can be advantageous for applying or using on a surface as a disinfectant or on a textile.

The inventors have further found that the anti-microbial efficacy of the cashew testa extract can be increased if the cashew testa is subjected to particular processing steps. It is believed that through these steps, the amount of active ingredients that is extracted is increased without adversely impacting its anti-microbial function. Further, the amount of impurities that is also extracted at the same time is not correspondingly further increased and can also be decreased. This is advantageous as when formulated as a product, it give a good look and feel to consumers. The increase in the ratio of active ingredients compared to impurities also decreases the effect of the impurities 'blocking' the anti-microbial efficacy of the active ingredient.

The present invention provides a method of synthesising a composition of cashew testa extract, comprising:
a) dispersing the cashew testa in a solvent in order to form a dispersion;
b) agitating the dispersion under heat and/or sonication in order to extract the phenolic compounds; and
c) filtering the dispersion in order to obtain a cashew testa extract composition;
wherein the cashew testa extract composition comprises phenolic compounds; and
wherein the cashew testa extract composition comprises protein, amino acid, sugar, or a combination thereof.

Advantageously, the agitation step (b) is found to increase the extraction of the active ingredient. Towards this end, it was found that compared to the comparator (shown below), the amount of active ingredient using the presently disclosed method is at least 0.5 times more.

In some embodiments, the agitation step is performed at a temperature of about 40° C. to about 100° C. In other embodiments, the temperature is about 80° C.

In other embodiments, the agitation step is under sonication is ultrasonication. The sonication can be under an elevated temperature, for example from about 40° C. to about 95° C. Advantageously, sonication was found to be more effective in extracting active ingredient than heat treatment.

In some embodiments, the agitating step is performed for about 1 h to about 24 h.

In some embodiments, the solvent is an aqueous medium.

Advantageously, as water can be used, there is ease of application of the composition on surfaces or textiles for an anti-microbial effect. The use of water also makes this method easy to scale up and green.

The term "aqueous solution" or "aqueous medium" used herein refers to a water based solvent or solvent system, and which comprises of mainly water. Such solvents can be either polar or non-polar, and/or either protic or aprotic. Solvent systems refer to combinations of solvents which resulting in a final single phase. Both 'solvents' and 'solvent systems' can include, and is not limited to, pentane, cyclopentane, hexane, cyclohexane, benzene, toluene, dioxane, chloroform, diethylether, dichloromethane, tetrahydrofuran, ethyl acetate, acetone, dimethylformamide, acetonitrile, dimethyl sulfoxide, nitromethane, propylene carbonate, formic acid, butanol, isopropanol, propanol, ethanol, methanol, acetic acid, ethylene glycol, diethylene glycol or water. Water based solvent or solvent systems can also include dissolved ions, salts and molecules such as amino acids, proteins, sugars and phospholipids. Such salts may be, but not limited to, sodium chloride, potassium chloride, ammonium acetate, magnesium acetate, magnesium chloride, magnesium sulfate, potassium acetate, potassium chloride, sodium acetate, sodium citrate, zinc chloride, HEPES sodium, calcium chloride, ferric nitrate, sodium bicarbonate, potassium phosphate and sodium phosphate. As such, biological fluids, physiological solutions and culture medium also fall within this definition. In most embodiments, the aqueous solution is water. In some embodiments, the aqueous solution is deionised water. In some embodiments, the aqueous solution is Millipore water.

An aqueous solution is advantageously used in the present disclosure. In particular, water is used. Water can be evaporated or sublimed from an aqueous solution via heating through controlled pressure and temperature making it the most green, desirably non-hazardous and non-toxic solvent to be used.

Cashew testa extract contains many polyphenols, including tannic acid. Tannic acid is a water soluble and reddish brown coloured molecule. It is believed that tannic acid, and in general phenolic compounds, can have an anti-microbial effect by binding to the bacteria, disrupt the bacteria's cell membrane integrity and also disrupt various functions inside the bacteria cell.

One hypothesis is that changes in various intracellular functions induced by hydrogen binding of the phenolic compounds to enzymes or by the modification of the cell wall rigidity with integrity losses due to different interactions with the cell membrane. This may induce irreversible damages of the cytoplasmic membrane and coagulation of the cell content that can even lead to the inhibition of intracellular enzymes. For example, condensed phenylpropanoids-tannins may induce damages at the cell membrane and even inactivate the metabolism by binding to enzymes while phenolic acids have been shown to disrupt membrane integrity, as they cause consequent leakage of essential intracellular constituents. Flavonoids may link to soluble proteins located outside the cells and with bacteria cell walls thus promoting the formation of complexes. Flavonoids also may act through inhibiting both energy metabolism and DNA synthesis thus affecting protein and RNA syntheses. In the case of Gram-positive bacteria, intracellular pH modification as well as interference with the energy (ATP) generating system were reported.

In some embodiments, the composition comprises polyphenols or phenolic compounds such as tannins, catechin, epicatechin, epigallocatechin, and p-coumaric, gallic acid, or a combination thereof. These polyphenols possess high antioxidant and demonstrate high free radical scavenging activity. The compounds of the phenolic compounds can be in any desired percentages or ratios. The phenolic compounds as used herein refer to chemical compounds that contain at least one aromatic ring with hydroxyl groups (—OH) attached.

In some embodiments, the composition comprises protein, amino acid, starch, carbohydrate, sugar, or a combination thereof.

"Polypeptide", "peptide" and "protein" are used interchangeably herein to refer to any polymer of amino acid residues (dipeptide or greater) linked through peptide bonds or modified peptide bonds and to variants and synthetic analogues of the same. Thus, these terms apply to amino acid polymers in which one or more amino acid residues is a synthetic non-naturally occurring amino acid, such as a chemical analogue of a corresponding naturally occurring amino acid, as well as to naturally-occurring amino acid polymers. Polypeptides of the present invention include, but are not limited to, naturally purified products, products of chemical synthetic procedures, and products produced by recombinant techniques from a prokaryotic or eukaryotic host, including, for example, bacterial, yeast, higher plant, insect and mammalian cells. The polypeptides of the invention may comprise non-peptidic components, such as carbohydrate groups. Carbohydrates and other non-peptidic substituents may be added to a polypeptide by the cell in which the polypeptide is produced, and will vary with the type of cell. For polypeptides that are made recombinantly, the nature and extent of the modifications in large part will be determined by the post-translational modification capacity of the particular host cell and the modification signals that are present in the amino acid sequence of the polypeptide in question. For instance, glycosylation patterns vary between different types of host cell. Polypeptides are defined herein, in terms of their amino acid backbone structures; substituents such as carbohydrate groups are generally not specified, but may be present nonetheless. In addition, polypeptides of the invention may also include an initial modified methionine residue, in some cases as a result of host-mediated processes. Proteins may be present as monomeric or as multimeric proteins e.g. as dimers (homo or heterodimers) or trimers.

As used herein, a carbohydrate is a biomolecule consisting of carbon (C), hydrogen (H) and oxygen (O) atoms, usually with a hydrogen-oxygen atom ratio of 2:1 (as in water) and thus with the empirical formula $C_m(H_2O)_n$ (where m may be different from n). However, not all carbohydrates conform to this precise stoichiometric definition (e.g., uronic acids, deoxy-sugars such as fucose). The term is a synonym of saccharide, a group that includes sugars, starch, and cellulose. The saccharides are divided into four chemical groups: monosaccharides, disaccharides, oligosaccharides, and polysaccharides. Monosaccharides and disaccharides, the smallest (lower molecular weight) carbohydrates, are commonly also referred to as sugars. Examples of carbohydrates or sugars are monosaccharides such as glucose, galactose, fructose, xylose; disaccharides such as sucrose, lactose, maltose, trehalose, polyols such as sorbitol, mannitol; oligosaccharides such as malto-oligosaccharides (maltodextrins), raffinose, stachyose, fructo-oligosaccharides; polysaccharides such as starch (amylose, amylopectin, modified starches) and non-starch polysaccharides (glycogen, cellulose, hemicellulose, pectins, hydrocolloids).

In some embodiments, a weight ratio of phenolic compounds to protein is about 1:100 to about 100:1.

In some embodiments, a weight ratio of phenolic compounds to sugar is about 1:100 to about 100:1.

In some embodiments, the filtering step (c) comprises passing the dispersion through microfiltration. The microfiltration can have a pore size of about 0.1 μm to about 10 μm.

Preferentially, the microfiltration can have a pore size of about 0.5 μm to about 5 μm. Alternatively, the filtering step (c) can comprise microfiltration, ultrafiltration, reverse osmosis, or a combination thereof.

In some embodiments, the method further comprises a step of washing the cashew testa prior to step (a). The washing step can be performed in a solvent selected from an aqueous medium, alcohol or N,N-dimethylformamide.

Advantageously, the washing step allows impurities such as protein, amino acids and sugars to be washed away. This gives the composition a 'cleaner' and greener consumer feel.

In some embodiments, the method further comprises a step of removing the solvent after step (c). In some embodiments, the solvent removal step is freeze drying.

Advantageously, this allows for the ease of transport and storage of the composition. The shelf-life of the composition can also be improved.

In some embodiments, the method further comprises a step of adding an excipient. The excipient can be a stabilising agent, dispersant, colorant, or a combination thereof. "Excipients" are inactive substances that serve as the vehicle or medium for an active substance, and include any and all solvents, dispersion media, inert diluents, or other liquid vehicles, dispersion or suspension aids, granulating agents, surface active agents, disintegrating agents, isotonic agents, thickening or emulsifying agents, preservatives, binding agents, lubricants, buffering agents, oils, and the like. Various excipients used in formulating compositions and known techniques for the preparation thereof is disclosed in G. A. R. Remington: The Science and Practice of Pharmacy, 21st ed. (2006), Lippincott Williams & Wilkins. Except insofar as any conventional excipient is incompatible with a substance or its derivatives, such as by producing any undesirable biological effect or otherwise interacting in a deleterious manner with any other component(s) of the pharmaceutical composition, its use is contemplated to be within the scope of this invention.

Excipients such as colouring agents, coating agents, preservatives and perfuming agents can be present in the composition, according to the judgment of the formulator. Examples of excipients are colloidal silica, hydroxypropyl methylcellulose, vitamin A, vitamin E, vitamin C, retinyl palmitate, selenium, sodium metabisulphite, propyl gallate, cysteine, methionine, citric acid, sodium citrate, methyl paraben, propyl paraben, benzalkaniumchloride, and lanolin.

Advantageously, this allows for the ease of transport and storage of the composition.

The shelf-life of the composition can also be further improved.

The present invention also provides a cashew testa extract composition, comprising:

a) phenolic compounds selected from tannins, catechin, epicatechin, epigallocatechin, p-coumaric, gallic acid or a combination thereof; and b) Protein, amino acid, sugar, or a combination thereof.

Combination of Cashew Testa Extract and Iron and/or Iron Oxide Particles

While the above mentioned cashew testa extract composition is advantageous, the inventors have found that it can be further improved. For example, the retention time of the extract on the surface can be further improved. The compounds of the extract in the comparator are also easily degraded, and hence the anti-microbial efficacy falls off rapidly. It was also further found that when the comparator is applied to a porous film, the compounds of the comparator extract are only retained on the interface and do not penetrate. Accordingly, the anti-microbial effects are not long lasting.

Microbial infections and the development of antimicrobial resistance have received attention as one of the most critical issues facing the public health and security. The creation of clean antimicrobial surfaces with long-term stabilities and activities have tremendous applications involving almost all aspects of our daily life, such as medical devices, hospital surfaces, textiles, packaging, electrical appliances, marine antifouling, filters and public surfaces. Inorganic antimicrobial materials, especially semiconductor antimicrobial materials are less prone to chemical contamination and possess long-term stability. Some metal or metal oxides, such as silver, zinc oxide and titanium oxide particles have been used as antimicrobial ingredients in various products or in antimicrobial surface coatings. However, these materials also have limitations such as heavy metal contamination/toxicity (for Ag based materials). For ZnO and $TiO_2$ materials, they suffer from low antimicrobial efficacies and limited applications, due to the dependence on photo irradiation. In addition, uncertainty nano-toxicity is another concern for nano-size materials.

Further, in contrast to when cashew testa extract is added as a coating layer on a fabric, it was found that by mixing in cashew testa extract during the synthesis of iron particles, the cashew testa extract can at least partially passivate the surface of iron particles. This further improves the stability of the iron particles as well as controls the release of ROS from the iron particles. Further advantageously, by reacting cashew testa extract with iron particles and/or iron oxide precursor, in addition to the partially passivate by the cashew testa extract, the cashew testa extract also forms part of a shell covering the iron particle such that the release of ROS can be extended for a longer duration Towards this end, the inventors have found that the anti-microbial efficacy can be further improved synergistically (or at least additively) through the combination of cashew testa extract and iron particles and/or iron oxide particles. Advantageously, the inventors have found that an iron based antimicrobial material is non-toxic, yet can be highly active against microbes, very stable and has long-term activity.

The iron particles can have a nano-structured protection shell covered the iron core. This shell is formed by the reaction of iron and cashew testa extract under non organic solvent conditions. The core-shell structure creates a special interface between iron core and iron complex shell which will change the potential of iron core and change the redox reaction pathway. Towards this end, it is believed that this self-corrosion process could also happen on $Fe/Fe_eO_3$, $Fe/Fe_eO_3$ particles and/or a combination thereof. The electrons generated from iron corrosion can be transferred into the conduction band (CB) of iron oxide in an energetically favourable way. The electrons in the CB are able to reduce oxygen and generate ROS. The iron particles could generate different ROS which include super oxide, singlet oxygen and hydroxyl radical. In other words, the electrons are donated from iron to iron oxide (CB) and reduce oxygen molecules to generate radicals in an energetically favorable way. The whole system does not rely on an external stimulus and the ROS generation process could be manipulated and have long-term stability. ROS will then kill contacted bacteria and virus. The ROS killing mechanism of the material while being similar to photo catalyst materials, such as ZnO and $TiO_2$, defers in that the iron/iron oxide particles is a self-catalysed material, it does not rely on photo irradiation to generate ROS. The iron particles sacrifices its iron core to generate ROS. New materials designed based on this concept could play pivotal roles as non-toxic and safe antimicrobial technology to replace organic disinfectants, antiseptics and antibiotics in a broad range of applications, especially in the control of infectious disease and antimicrobial resistance (AMR) transmission.

In some embodiments, the cashew testa extract is mixed or reacted with the iron particles and/or iron oxide particles. Advantageously, the mixing allows components of cashew testa extract to at least partially passivate the surface of the iron particles and/or iron oxide particles. This places it in close proximity such that when "activated", a shell can form and the ROS process initiated. Alternatively, by reacting cashew testa extract with iron particles and/or iron oxide particles (or its precursors thereof), a shell which releases ROS can be formed.

The present invention also provides a method of synthesising an iron-iron oxide composition, comprising:

a) mixing a cashew testa extract with iron particles and/or iron oxide particles in order to obtain an iron-iron oxide composition;

wherein the cashew testa extract comprises phenolic compounds;

wherein the cashew testa extract comprises protein, amino acid, sugar, or a combination thereof; and wherein the iron particles and/or iron oxide particles are at least partially passivating by the cashew testa extract.

As used herein, 'particles' refer to micron-sized particles and/or nano-sized particles. Microparticles are particles between 1 and 1000 μm in size. Nanoparticles are particles between 1 nm to 1000 nm in size. The particles can be of any shape or morphology, such as spherical, rod-like, or asymmetrical.

Advantageously, it was found that the physical combination of cashew testa extract with iron particles and/or iron oxide particles act synergistically (or at least additively) on each other such that the anti-microbial effect is increased. Without wanting to be bound by theory, it is believed that when the compounds in cashew testa extract are allowed to passivate the iron/iron oxide particles, aggregation and/or agglomeration of iron/iron oxide particles can be decreased. Further, as the stability of the particles are improved, it was found that when applied to a porous substrate or textile, the composition can impregnate the surface of the porous substrate. This is in contrast to cashew testa extract alone or iron/iron oxide particles alone, where they are found to reside at the surface. Accordingly, the retention time of the composition on the surface is improved, and the anti-microbial efficacy is correspondingly increased.

At least the phenolic compounds when adsorbed on the surface of the iron/iron oxide particles were found to be slightly protected from degraded, hence ensuring that the anti-microbial effect is longer lasting.

In some embodiments, the iron oxide particles is a core-shell particle, wherein the core is an elemental iron core or an iron alloy core; and the shell is an iron oxide shell. In some embodiments, the iron particles and/or iron oxide particles is an iron-iron oxide particle. In some embodiments, the iron-iron oxide composition comprises iron, iron (II) oxide and iron (III) oxide. In some embodiments, the iron relative to the iron-iron oxide composition is at more than 90% w/w. In other embodiments, the iron relative to the iron-iron oxide composition is at more than 91% w/w, more than 92% w/w, more than 93% w/w, more than 94% w/w, more than 95% w/w, more than 96% w/w, or more than 97% w/w. In other embodiments, the iron (II) oxide and iron (III) oxide relative to the iron-iron oxide composition is at less than 10% w/w. In other embodiments, the iron (II) oxide and iron (III) oxide relative to the iron-iron oxide composition is at less than 9% w/w, at less than 8% w/w, at less than 7% w/w, at less than 6% w/w, at less than 5% w/w, at less than 4% w/w, or at less than 3% w/w.

In some embodiments, the iron is elemental iron. In other embodiments, the iron (II) oxide is FeO. In other embodiments, the iron (II) oxide is $Fe_2O_3$. In other embodiments, the iron (II) oxide and iron (III) oxide is $Fe_3O_4$. In this regard, the iron-iron oxide composition can be a mixture of Fe, FeO, $Fe_2O_3$ and $Fe_3O_4$.

In other embodiments, the iron particles and/or iron oxide particles further comprises a carbohydrate. In some embodiments, the carbohydrate relative to the iron-iron oxide composition is at about 2% w/w to about 6% w/w. In other embodiments, the carbohydrate relative to the iron-iron oxide composition is at about 2% w/w to about 5% w/w, or about 3% w/w to about 5% w/w. In some embodiments, the carbohydrate relative to the iron-iron oxide composition is at about 2% w/w to about 20% w/w.

The carbohydrate can be selected from monosaccharide, disaccharide, oligosaccharide, and polysaccharide. Examples of carbohydrate are, but not limited to, glucose, galactose, fructose, xylose, sucrose, lactose, maltose, treha-lose, sorbitol, mannitol, maltodextrin, raffinose, stachyose, fructo-oligosaccharide, amylose, amylopectin, modified starch, glycogen, dextran, chitosan, glycosaminoglycans, alginate, ulvan, gum Arabic, gellan gum, cellulose, hemi-cellulose, ethylcellulose, methylcellulose, pectin, hydrocol-loid and a combination thereof.

In some embodiments, the iron particles and/or iron oxide particles comprises iron, $Fe_3O_4$ and a carbohydrate. In some embodiments, the iron relative to the iron-iron oxide com-position is at more than 95% w/w, the $Fe_3O_4$ relative to the iron-iron oxide composition is at less than 2% w/w, and the carbohydrate relative to the iron-iron oxide composition is at about 3% w/w to about 5% w/w.

In other embodiments, the iron particles and/or iron oxide particles further comprises an amino acid. In some embodi-ments, the amino acid relative to the iron-iron oxide com-position is at about 2% w/w to about 6% w/w. In other embodiments, the amino acid relative to the iron-iron oxide composition is at about 2% w/w to about 5% w/w, or about 3% w/w to about 5% w/w.

In some embodiments, the iron particles and/or iron oxide particles comprises iron, $Fe_3O_4$ and an amino acid. In some embodiments, the iron relative to the iron-iron oxide com-position is at more than 95% w/w, the $Fe_3O_4$ relative to the iron-iron oxide composition is at less than 2% w/w, and the amino acid relative to the iron-iron oxide composition is at about 3% w/w to about 5% w/w.

In other embodiments, the iron particles and/or iron oxide particles further comprises an amino acid, carbohydrate or a mixture thereof. In some embodiments, the amino acid, carbohydrate or a mixture thereof relative to the iron-iron oxide composition is at about 2% w/w to about 6% w/w. In other embodiments, the the amino acid, carbohydrate or a mixture thereof relative to the iron-iron oxide composition is at about 2% w/w to about 5% w/w, or about 3% w/w to about 5% w/w. For example, a mixture of methylcellulose and zein can be used.

In some embodiments, the iron particles and/or iron oxide particles comprises iron, $Fe_3O_4$, and amino acid, carbohy-drate or a mixture thereof. In some embodiments, the iron relative to the iron-iron oxide composition is at more than 95% w/w, the $Fe_3O_4$ relative to the iron-iron oxide compo-sition is at less than 2% w/w, and the amino acid, carbohy-drate or a mixture thereof relative to the iron-iron oxide composition is at about 3% w/w to about 5% w/w.

In some embodiments, the iron particles and/or iron oxide particles is provided as a powder with a particle size of about 10 nm to about 100 μm. In other embodiments, the iron particles and/or iron oxide particles has a particle size of about 10 nm to about 100 μm. In other embodiments, the iron particles and/or iron oxide particles has a particle size of about 1 μm to about 800 μm. The iron particles and/or iron oxide particles can be micron sized particles. In other embodiments, the particle size is about about 1 μm to about 700 μm, about 1 μm to about 600 μm, about 1 μm to about 500 μm, about 1 μm to about 400 μm, about 1 μm to about 300 μm, about 1 μm to about 200 μm, about 1 μm to about 100 μm, 1 μm to about 90 μm, about 1 μm to about 80 μm, about 1 μm to about 70 μm, about 1 μm to about 60 μm, about 1 μm to about 50 μm, about 1 μm to about 50 μm, about 1 μm to about 40 μm, about 1 μm to about 30 μm, or about 10 μm to about 40 μm.

In some embodiments, the iron particles and/or iron oxide particles is a plurality of micron sized particles. For example, the particles can have an iron core, which can be encapsulated with a shell. In some embodiments, the shell comprises an amino acid, carbohydrate or a mixture thereof. In some embodiments, the shell comprises an amino acid. In some embodiments, the shell comprises a carbohydrate.

In some embodiments, the iron particles and/or iron oxide particles is a plurality of iron core-shell micron sized par-ticles, wherein the core comprises Fe and the shell comprises an amino acid. In other embodiments, the iron particles and/or iron oxide particles is a plurality of iron core-shell micron sized particles, wherein the core comprises Fe, the shell comprises an amino acid, and an interface between the core and the shell comprises iron oxide. In some embodi-ments, the iron oxide is $Fe_3O_4$. In some embodiments, the amino acid is selected from glycine, alanine, valine, leucine, isoleucine, methionine, proline, phenylalanine, tryptophane, serine, threonine, cysteine, tyrosine, asparagine, aspartic acid, glutamine, glutamic acid, lysine, arginine, histidine, taurine, betaine, N-methylalanine or a combination thereof.

Advantageously, when the iron particles are encapsulated with a shell, the iron core can be protected by an encapsu-lation shell material comprising the amino acid and/or carbohydrate. This may further delays the formation of iron oxide and hence the production of ROS until its use in the face mask. This prevents or reduces over oxidation of iron particles, and thus allows for a longer shelf life of the face mask and/or create a further persistence ROS over a longer period of time. Further, the amino acid and/or carbohydrate encapsulation material can change the potential of iron core and change the redox reaction pathway. For example, the iron oxide generated can form an interface layer between the shell and the Fe core. This allows the generation and release of ROS to be controlled. In this way, the shell on the iron particles controls the rate of iron oxidation, such that a constant release of ROS is available, which is sufficient for the anti-bacterial and/or anti-viral effect. This improves its suitability for multiple uses, allowing for additional washing. A further advantage is that as a natural compound such as a biopolymer is used to encapsulate the iron particle, the biodegradable nature of the biopolymer causes the shell to break down over time. For example, the shell can be broken down over time after multiple washing. This provides an additional anti-microbial and/or anti-viral persistence effect, as the previously less accessible inner iron core can now be more easily accessed.

In some embodiments, the shell has a thickness of about 5 nm to about 1 μm, or about 50 nm to about 400 nm. In other embodiments, the thickness is of about 50 nm to 350 nm, about 50 nm to about 300 nm, about 100 nm to about 300 nm, about 150 nm to about 300 nm, or about 200 nm to about 300 nm.

The shell can further comprise iron. In this regard, in some embodiments, the shell comprises iron and an amino acid, carbohydrate or a mixture thereof. Advantageously, as the iron is closer to the surface of the particles, the presence of iron in the shell can 'kick starts' the oxidation of iron to iron oxide. In this sense, a burst release of ROS is provided at first instance, which can provide protection to a user when the face mask is first used and before sufficient water is provided as moisture to the iron core.

In some embodiments, the iron particles and/or iron oxide particles is a plurality of iron core-shell micron sized particles, wherein the core comprises Fe and the shell comprises Fe and an amino acid. In other embodiments, the iron particles and/or iron oxide particles is a plurality of iron core-shell micron sized particles, wherein the core comprises Fe, the shell comprises Fe and an amino acid, and an interface between the core and the shell comprises iron oxide. In some embodiments, the iron oxide is $Fe_3O_4$. In some embodiments, the amino acid is selected from glycine, alanine, valine, leucine, isoleucine, methionine, proline, phenylalanine, tryptophane, serine, threonine, cysteine, tyrosine, asparagine, aspartic acid, glutamine, glutamic acid, lysine, arginine, histidine, taurine, betaine, N-methylalanine or a combination thereof.

In some embodiments, the iron oxide particles is at least partially passivated by the phenolic compounds in the cashew testa extract. In some embodiments, the iron oxide particles is at least partially passivated by the amino acid in the cashew testa extract. In some embodiments, the iron oxide particles is at least partially passivated by the sugar in the cashew testa extract. In some embodiments, the iron oxide particles is further at least partially passivated by a carboxylate acid moiety or a hydroxyl moiety.

In some embodiments, the carboxylic acid is selected from fatty acid, aromatic carboxylic acid, dicarboxylic acid, tricarboxylic acid, keto acid, α-hydroxyl acid, divinylether fatty acid, phosphoric acid, polyphosphoric acid, tungstic acid, vanadic acid, molybdic acid, heteropolyacid, or a combination thereof.

In some embodiments, the iron oxide particles comprises elemental Fe, FeO, $Fe_2O_3$, $Fe_3O_4$, or a combination thereof.

The present invention also provides an iron-iron oxide composition, comprising:

a) phenolic compounds selected from tannins, catechin, epicatechin, epigallocatechin, p-coumaric, gallic acid or a combination thereof;

b) Protein, amino acid, sugar, or a combination thereof; and c) iron particles and/or iron oxide particles;

wherein the iron particles and/or iron oxide particles are at least partially passivated by the phenolic compounds.

The anti-microbial efficacy of the composition can be further improved by incorporating the cashew testa extract in/onto the iron/iron oxide particles in a synthetic reaction; i.e. chemically reacting at least the phenolic compounds onto the iron/iron oxide particles.

The present invention also provides a method of synthesising an iron-iron oxide composition, comprising:

a) reacting a cashew testa extract with an iron powder in order to form iron oxide particles; and wherein the cashew testa extract comprises phenolic compounds;

wherein the cashew testa extract comprises protein, amino acid, sugar, or a combination thereof;

wherein the iron oxide particles are at least partially passivating by the cashew testa extract.

Advantageously, by allowing the cashew testa extract to react with the iron powder, an activated shell of iron oxide and cashew testa extract can be formed on a core of elemental iron or iron alloy. The thickness of the iron oxide shell can be controlled by the reaction conditions as well as the amount of cashew testa extract to iron powder ratio. The formation of a cashew-iron oxide shell provides for a greater anti-microbial efficacy as the retention time is longer and the surface area of contact is increased. Additionally, it was found that having a core of elemental iron or iron alloy is advantageous as it regenerates the outer iron oxide shell as the shell gets 'used up'.

In some embodiments, the shell further comprises a component from cashew testa extract. The component can be selected from protein, amino acid, sugar, phenolic compounds or a combination thereof.

In some embodiments, the iron oxide particles are at least partially passivating by the phenolic compounds. Towards this end, the unreacted cashew testa extract can physically adsorb on the surface of the iron oxide particles through like-like interactions. This provides for greater stability of the composition, and hence shelf-life.

In some embodiments, the method further comprises a step of reacting the product of step (a) with an iron oxide precursor in order to form iron oxide particles.

In some embodiments, the reaction step comprises purging the mixture of cashew testa extract with an iron powder with nitrogen.

In some embodiments, the reaction step is performed at about 50° C. to about 180° C. In some embodiments, the reaction is performed at about 5° C. to about 80° C.

In some embodiments, the reaction step is performed for about 1 h to about 50 h. In some embodiments, the reaction is performed for about 1 min to about 24 h.

In some embodiments, wherein the reaction step is performed in a solvent selected from an aqueous medium, alcohol, or N,N-dimethylformamide.

In some embodiments, the reaction step further comprises an acid selected from carboxylic acid, amino acid, or a combination thereof.

In some embodiments, the carboxylic acid is selected from fatty acid, aromatic carboxylic acid, dicarboxylic acid, tricarboxylic acid, keto acid, α-hydroxyl acid, divinylether fatty acid, phosphoric acid, polyphosphoric acid, tungstic acid, vanadic acid, molybdic acid, heteropolyacid, or a combination thereof.

In some embodiments, the carboxylic acid is selected from benzoic acid, phosphoric acid, sulphuric acid, or a combination thereof.

In some embodiments, a weight ratio of the iron powder to acid is about 1:100 to about 100:1.

In some embodiments, the iron powder has an average particle size of about 10 nm to about 800 μm.

In some embodiments, the iron oxide particles is a core-shell particle, wherein the core is an iron core or an iron alloy core; and the shell is an iron oxide shell.

Accordingly, in some embodiments, the method of syn-thesising an iron-iron oxide composition, comprises:

reacting a cashew testa extract with iron particles and an iron oxide precursor in order to form iron-iron oxide core-shell particles having an elemental iron core or an iron alloy core, and an iron oxide shell;

wherein the cashew testa extract comprises a component selected from protein, amino acid, sugar, phenolic compounds or a combination thereof; and wherein the iron particles and/or iron oxide particles are at least partially passivating by the cashew testa extract.

In some embodiments, the iron particles and an iron oxide precursor are homogenously mixed before reacting with the cashew testa extract. This enables a more homogenous shell coating on the iron particles.

In some embodiments, when the cashew testa extract comprises phenolic compounds, a weight ratio of the phe-nolic compounds to iron particles and iron oxide precursor is about 1:500 to about 500:1. In other embodiments, the weight ratio is about 1:200 to about 200:1, or about 1:100 to about 100:1.

The present invention also provides an iron-iron oxide composition, comprising:

a) phenolic compounds selected from tannins, catechin, epicatechin, epigallocatechin, p-coumaric, gallic acid or a combination thereof;

b) Protein, amino acid, sugar, or a combination thereof; and c) iron oxide particles;

wherein the iron oxide particles is a core-shell particle, the core is an elemental iron core or an iron alloy core, and the shell is an iron oxide shell; and wherein the iron oxide particles is at least partially passivated by the phenolic compounds.

The present invention also provides an iron-iron oxide composition, comprising: a) iron particles and/or iron oxide particles; and b) cashew testa extract;

wherein the iron particles and/or iron oxide particles is at least partially passivated by the cashew testa extract.

In some embodiments, the iron-iron oxide composition comprises:

a) iron particles and/or iron oxide particles; and b) cashew testa extract;

wherein the cashew testa extract comprises a component selected from protein, amino acid, sugar, phenolic compounds or a combination thereof, the phenolic compounds selected from tannins, catechin, epicat-echin, epigallocatechin, p-coumaric, gallic acid, or a combination thereof; and wherein the iron particles and/or iron oxide particles is at least partially passivated by the protein, amino acid, sugar, phenolic compounds, or a combination thereof.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the iron particles and/or iron oxide particles is at least partially passivated by the cashew testa extract.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicat-echin, epigallocatechin, p-coumaric, gallic acid, or a combination thereof; and wherein the iron particles and/or iron oxide particles is at least partially passivated by the protein, amino acid, sugar, phenolic compounds, or a combination thereof.

In some embodiments, the iron particles and/or iron oxide particles is further at least partially passivated by a carboxy-late acid moiety or a hydroxyl moiety.

In some embodiments, the carboxylic acid is selected from fatty acid, aromatic carboxylic acid, dicarboxylic acid, tricarboxylic acid, keto acid, α-hydroxyl acid, divinylether fatty acid, phosphoric acid, polyphosphoric acid, tungstic acid, vanadic acid, molybdic acid, heteropolyacid, or a combination thereof.

In some embodiments, the iron particles and/or iron oxide particles comprises elemental Fe, FeO, $Fe_2O_3$, $Fe_3O_4$, or a combination thereof.

In some embodiments, the iron particles and/or iron oxide particles have an average particle size of about 1 μm to about 800 μm.

In some embodiments, the shell further comprises a component from cashew testa extract.

In some embodiments, the shell has a thickness of about 5 nm to about 1 μm.

In some embodiments, the iron and/or iron oxide relative to the iron-iron oxide composition is at more than 99% w/w, and the cashew testa extract relative to the iron-iron oxide composition is at less than 1% w/w.

In some embodiments, the iron relative to the iron-iron oxide composition is at more than 85% w/w; and iron oxide relative to the iron-iron oxide composition is at less than 14% w/w.

In some embodiments, the iron-iron oxide composition further comprises an excipient selected from stabilising agent, dispersant, colorant, or a combination thereof.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicat-echin, epigallocatechin, p-coumaric, gallic acid, or a combination thereof;

wherein the iron particles and/or iron oxide particles is at least partially passivated by the protein, amino acid, sugar, phenolic compounds, or a combination thereof; and wherein the iron-iron oxide particles have an average particle size of about 1 μm to about 800 μm.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof;

wherein the iron particles and/or iron oxide particles is at least partially passivated by the protein, amino acid, sugar, phenolic compounds, or a combination thereof;

wherein the shell further comprises a component from cashew testa extract; and wherein the iron-iron oxide particles have an average particle size of about 1 μm to about 800 μm.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof;

wherein the iron particles and/or iron oxide particles is at least partially passivated by the protein, amino acid, sugar, phenolic compounds, or a combination thereof;

wherein the shell further comprises a component from cashew testa extract;

wherein the iron-iron oxide particles have an average particle size of about 1 μm to about 800 μm; and wherein an iron content relative to the iron-iron oxide composition is about 20 w/w % to about 80 w/w % and an oxygen content relative to the iron-iron oxide composition is about 15 w/w % to about 40 w/w %.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof;

wherein the iron particles and/or iron oxide particles is at least partially passivated by the protein, amino acid, sugar, phenolic compounds, or a combination thereof;

wherein the shell further comprises a component from cashew testa extract; wherein the iron-iron oxide particles have an average particle size of about 1 μm to about 800 μm;

wherein an iron content relative to the iron-iron oxide composition is about 20 w/w % to about 80 w/w % and an oxygen content relative to the iron-iron oxide composition is about 15 w/w % to about 40 w/w %; and wherein a carbon content relative to the iron-iron oxide composition is about 4 w/w % to about 50 w/w %.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof;

wherein the iron particles and/or iron oxide particles is at least partially passivated by the protein, amino acid, sugar, phenolic compounds, or a combination thereof;

wherein the shell further comprises a component from cashew testa extract; wherein the iron-iron oxide particles have an average particle size of about 1 μm to about 800 μm;

wherein an iron content relative to the iron-iron oxide composition is about 20 w/w % to about 80 w/w % and an oxygen content relative to the iron-iron oxide composition is about 15 w/w % to about 40 w/w %;

wherein a carbon content relative to the iron-iron oxide composition is about 4 w/w % to about 50 w/w %; and wherein the iron oxide is iron (II) oxide and iron (III) oxide.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof;

wherein the iron particles and/or iron oxide particles is at least partially passivated by the protein, amino acid, sugar, phenolic compounds, or a combination thereof;

wherein the shell further comprises a component from cashew testa extract; wherein the iron-iron oxide particles have an average particle size of about 1 μm to about 800 μm;

wherein an iron content relative to the iron-iron oxide composition is about 20 w/w % to about 80 w/w % and an oxygen content relative to the iron-iron oxide composition is about 15 w/w % to about 40 w/w %;

wherein a carbon content relative to the iron-iron oxide composition is about 4 w/w % to about 50 w/w %; and wherein the iron oxide is iron (II) oxide or iron (III) oxide.

In some embodiments, the iron-iron oxide composition, comprises:

a) a cashew testa extract; and b) iron-iron oxide core-shell particles, the core is an elemental iron core or an iron alloy core, and the shell is an iron oxide shell;

wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof;

wherein the iron particles and/or iron oxide particles is at least partially passivated by the protein, amino acid, sugar, phenolic compounds, or a combination thereof;

wherein the shell further comprises a component from cashew testa extract; wherein the iron-iron oxide particles have an average particle size of about 1 μm to about 800 μm;

wherein an iron content relative to the iron-iron oxide composition is about 20 w/w % to about 80 w/w % and an oxygen content relative to the iron-iron oxide composition is about 15 w/w % to about 40 w/w %;

wherein a carbon content relative to the iron-iron oxide composition is about 4 w/w % to about 50 w/w %; and wherein the iron oxide is iron (III) oxide.

The present invention also provides a method of synthesising an iron-iron oxide composition, comprising:

a) reacting the cashew testa extract with an iron oxide particle precursor in order to form iron oxide nanoparticles;

wherein the cashew testa extract comprises phenolic compounds;

wherein the cashew testa extract comprises protein, amino acid, sugar, or a combination thereof;

wherein the iron oxide nanoparticles is at least partially passivated by the phenolic compounds.

Without wanting to be bound by theory, the inventors believe that iron oxide nanoparticles can be synthesised through plant-mediated green chemistry approach via using plant extract as a reducing agent and a metal precursor under suitable conditions. This process consists of three steps: (1) the activation phase in which the metal ions are reduced by the phenolic compounds in the plant extract followed by the nucleation of reduced metal atoms; (2) the growth phase, where small NPs adhere to form large sized NPs (Ostwald ripening); and (3) the termination phase, during which NPs attain their shape. The phenolic compounds can also act as stabilizing agents, capping the surface of the nanoparticles.

Advantageously, by allowing the cashew testa extract to react with the iron oxide precursor, an activated iron oxide and cashew testa extract nanoparticle can be formed. In this method, the whole of the nanoparticle is activated. The size of the iron oxide nanoparticles can be controlled by the reaction conditions as well as the amount of cashew testa extract to iron oxide precursor ratio. Activity is found to be greater for these nanoparticles due to the increased surface area and surface energy, which favours an equilibrium towards dissolution.

In some embodiments, the iron oxide nanoparticles comprises elemental iron. In other embodiments, the iron oxide nanoparticles comprises an iron-cashew testa extract complex. In other embodiments, the iron oxide nanoparticles comprises an iron-phenolic compound complex. To this end, the nanoparticle is made up of network or matrix of iron atoms and phenolic compounds (or at least carbon atoms).

In some embodiments, the iron oxide nanoparticles are at least partially passivating by the phenolic compounds. Towards this end, the unreacted cashew testa extract can physically adsorb on the surface of the iron oxide nanoparticles through like-like interactions. This provides for greater stability of the composition, and hence shelf-life.

In some embodiments, a volume ratio or weight ratio of the cashew testa extract to iron oxide particle precursor is about 100:1 to about 1:100. In other embodiments, the ratio is about 90:1, 80:1, 70:1, 60:1, 50:1, 40:1, 30:1, 20:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:20, 1:30, 1:40, 1:50, 1:60, 1:70, 1:80, or 1:90.

In some embodiments, the iron oxide nanoparticles has an average size of about 1 nm to about 1000 nm. In other embodiments, the average size is about 10 nm to about 50 nm.

In some embodiments, the method further comprises a step of reacting the iron oxide nanoparticles with an iron powder in order to form iron oxide particles.

In both the physical mixing and chemical reaction of cashew testa extract composition with iron particles and/or iron oxide particles, the methods can further comprises a step of adding a base. The base such as NaOH, KOH, $NH_4OH$ can be added to the iron particles and/or iron oxide particles. The addition of a base can, for example, facilitate the formation of iron oxide on the iron particles through an oxidation process.

The base can also be added to the iron oxide particle precursor. As $Fe(OH)_2$ and $Fe(OH)_3$ can formed at pH>8 by the hydroxylation of the ferrous and ferric ions, the formation of iron oxide particles can be facilitated.

The base can also be added to the cashew testa extract composition. For example, the oxidation of phenolic compounds can be controlled by the amount of NaOH added into the reaction. This can drive the formation of the iron oxide particle as well as the adsorption of the phenolic compounds for passivating the surfaces. Further, by controlling the ionisation of the phenolic compounds in the cashew testa extract composition through controlling the pH, the antimicrobial efficacy can be varied.

The present invention also provides an iron-iron oxide composition, comprising:

a) phenolic compounds selected from tannins, catechin, epicatechin, epigallocatechin, p-coumaric, gallic acid or a combination thereof;

b) Protein, amino acid, sugar, or a combination thereof; and c) iron oxide nanoparticles;

wherein the iron oxide nanoparticles is at least partially passivated by the phenolic compounds.

The present invention also provides a method of synthesising an iron-iron oxide composition, comprising:

a) sequentially reacting a cashew testa extract with an iron powder and an iron oxide particle precursor in any order in order to form iron oxide particles; and wherein the cashew testa extract comprises phenolic compounds;

wherein the cashew testa extract comprises protein, amino acid, sugar, or a combination thereof;

wherein the iron oxide particles are at least partially passivating by the cashew testa extract.

For example, the sequential addition of the reagents for reaction can be:

| Example | $1^{st}$ reagent | $2^{nd}$ reagent | $3^{rd}$ reagent |
|---|---|---|---|
| A | Cashew testa extract | Iron powder | |
| B | Cashew testa extract | iron oxide particle precursor | |
| C | Cashew testa extract | Iron powder | iron oxide particle precursor |
| D | Cashew testa extract | iron oxide particle precursor | Iron powder |

-continued

| Example | 1st reagent | 2nd reagent | 3rd reagent |
|---|---|---|---|
| E | Cashew testa extract | Iron powder and iron oxide particle precursor | |
| F | Iron powder and iron oxide particle precursor | Cashew testa extract | |

The present invention also provides a method of synthesising an iron-iron oxide composition, comprising:

a) reacting a cashew testa extract with an iron powder in order to form iron particles;

b) reacting the iron particles with an iron oxide particle precursor in order to form iron oxide particles; and wherein the cashew testa extract comprises phenolic compounds;

wherein the cashew testa extract comprises protein, amino acid, sugar, or a combination thereof;

wherein the iron oxide particles are at least partially passivating by the cashew testa extract.

Advantageously, this method generates a homogenous activated iron oxide cashew extract shell on a core of iron. By further reacting with the iron oxide precursor, the shell thickness can be increased, and accordingly, the amount of active ingredient present at any one time is increased. Further advantageously, the stability of the particles is increased.

In some embodiments, the shell comprises an iron-cashew testa extract complex. In other embodiments, the shell comprises an iron-phenolic compound complex. To this end, the shell is made up of network or matrix of iron atoms and phenolic compounds (or at least carbon atoms).

In some embodiments, the iron oxide particle precursor is an iron (III) salt.

In some embodiments, an anion of the iron (III) salt is selected from nitrate, chloride, bromide, fluoride, iodide, sulphate, oxalate, perchlorate, phosphate, tetrafluoroborate, or a combination thereof. The iron (III) salt can be its hydrated form thereof.

In some embodiments, a volume ratio or weight ratio of the cashew testa extract to iron powder is about 100:1 to about 1:100.

In some embodiments, a volume ratio or weight ratio of the cashew testa extract with an iron powder to iron oxide precursor is about 100:1 to about 1:100.

In some embodiments, a volume ratio or weight ratio of the phenolic compounds to iron powder is about 1:100 to about 100:1.

In some embodiments, a volume ratio or weight ratio of the phenolic compounds to iron oxide particle precursor is about 1:100 to about 100:1.

In some embodiments, the reaction step further comprises an acid selected from carboxylic acid, amino acid, or a combination thereof.

In some embodiments, the carboxylic acid is selected from fatty acid, aromatic carboxylic acid, dicarboxylic acid, tricarboxylic acid, keto acid, α-hydroxyl acid, divinylether fatty acid, phosphoric acid, polyphosphoric acid, tungstic acid, vanadic acid, molybdic acid, heteropolyacid, or a combination thereof.

In some embodiments, the carboxylic acid is selected from benzoic acid, phosphoric acid, sulphuric acid, or a combination thereof.

In some embodiments, a weight ratio of the iron powder to acid is about 1:100 to about 100:1.

In some embodiments, the iron powder has an average particle size of about 10 nm to about 100 μm.

In some embodiments, the reaction step is performed at about 50° C. to about 180° C.

In some embodiments, the reaction step is performed for about 1 h to about 50 h.

In some embodiments, the reaction step is performed in a solvent selected from an aqueous medium, alcohol, or N,N-dimethylformamide.

In some embodiments, the iron oxide particles is a core-shell particle, wherein the core is an elemental iron core or an iron alloy core; and the shell is an iron oxide shell.

In some embodiments, the shell is a homogenous shell. As used herein, 'homogenous' refers to the shell having a same proportions of its components throughout. In this regard, the shell is an iron oxide layer in which cashew testa extract is homogenously dispersed within the layer (or at least at an interface). The shell can also be of a homogenous thickness throughout. For example, the thickness measured at various portions of a single iron oxide particle can vary at (or have a standard deviation of) less than 30%, less than 20% or less than 10%.

The present invention also provides an iron-iron oxide composition, comprising:

a) phenolic compounds selected from tannins, catechin, epicatechin, epigallocatechin, p-coumaric, gallic acid or a combination thereof;

b) Protein, amino acid, sugar, or a combination thereof; and c) iron oxide particles;

wherein the iron oxide particles is a core-shell particle, the core is an iron core or an iron alloy core, and the shell is an iron oxide shell; and wherein the iron oxide particles is at least partially passivated by the phenolic compounds.

The present invention also provides a method of synthesising an iron-iron oxide composition, comprising:

a) reacting a cashew testa extract with an iron oxide particle precursor in order to form iron oxide nanoparticles;

b) reacting the iron oxide nanoparticles with an iron powder in order to form iron oxide particles; and wherein the cashew testa extract comprises phenolic compounds;

wherein the cashew testa extract comprises protein, amino acid, sugar, or a combination thereof;

wherein the iron oxide particles is at least partially passivated by the phenolic compounds.

Advantageously, by first forming the iron oxide nanoparticles and subsequently adhering the nanoparticles on the larger iron powder, a particle with patchy shell of iron oxide on an iron core is formed. Because of the patchiness of the shell, the activity of the iron oxide is increased, while the problem of aggregation of nanoparticles is minimised. Further, as the nanoparticles are anchored to a heavier and larger particle, the retention on a surface is improved; i.e. it is less easily washed away.

As used herein, 'patchy particles' or 'patchy nanoparticles' are micron- or nanoscale colloidal particles that are anisotropically patterned. This can be either by modification of the particle surface chemistry ("enthalpic patches"), through particle shape ("entropic patches"), or both.

In some embodiments, the iron oxide particles is a core-shell particle, the core is an iron core or an iron alloy core, and the shell is a patchy shell of iron oxide nanoparticles.

In some embodiments, a volume ratio or weight ratio of the cashew testa extract to iron oxide particle precursor is about 100:1 to about 1:100.

In some embodiments, a volume ratio or weight ratio of the iron oxide nanoparticle precursor to iron powder is about 100:1 to about 1:100.

The present invention also provides an iron-iron oxide composition, comprising:

a) phenolic compounds selected from tannins, catechin, epicatechin, epigallocatechin, p-coumaric, gallic acid or a combination thereof;

b) protein, amino acid, sugar, or a combination thereof; and c) iron oxide particles;

wherein the iron oxide particles is a core-shell particle, the core is an iron core or an iron alloy core, and the shell is an patchy shell of iron oxide nanoparticles; and wherein the iron oxide particles is at least partially passivated by the phenolic compounds.

In some embodiments, the iron-iron oxide composition has an iron content relative to the iron-iron oxide composition of about 20 w/w % to about 80 w/w %, about 20 w/w % to about 70 w/w %, about 20 w/w % to about 60 w/w %, about 20 w/w % to about 50 w/w %, about 20 w/w % to about 40 w/w %, about 20 w/w % to about 30 w/w %, about 20 w/w % to about 30 w/w %, about 20 w/w % to about 29 w/w %, about 20 w/w % to about 28 w/w %, about 20 w/w % to about 27 w/w %, about 20 w/w % to about 26 w/w %, or about 20 w/w % to about 25 w/w %.

In some embodiments, the iron-iron oxide composition has an oxygen content relative to the iron-iron oxide composition of about 15 w/w % to about 40 w/w %, about 20 w/w % to about 40 w/w %, about 20 w/w % to about 38 w/w %, about 20 w/w % to about 36 w/w %, about 20 w/w % to about 34 w/w %, about 20 w/w % to about 32 w/w %, about 20 w/w % to about 30 w/w %, or about 20 w/w % to about 28 w/w %.

In some embodiments, the iron-iron oxide composition has an carbon content relative to the iron-iron oxide composition of about 4 w/w % to about 50 w/w %, about 10 w/w % to about 50 w/w %, about 20 w/w % to about 50 w/w %, about 30 w/w % to about 50 w/w %, about 32 w/w % to about 50 w/w %, about 34 w/w % to about 50 w/w %, about 36 w/w % to about 50 w/w %, about 38 w/w % to about 50 w/w %, about 40 w/w % to about 50 w/w %, about 42 w/w % to about 50 w/w %, or about 44 w/w % to about 50 w/w %.

The cashew testa extract composition can further comprise an excipient such as a surfactant, a stabiliser and/or polymers. Such excipients can act to improve the dispersibility of the iron particles and/or iron oxide particles in the application medium. Surfactants are compounds that lower the surface tension (or interfacial tension) between two liquids, between a gas and a liquid, or between a liquid and a solid. Examples of surfactants are sodium lauryl sulfate (SDS), cetyl trimethylammonium bromide (CTAB), Triton X-100, X-114, CHAPS, DOC, NP-40, octyl thioglucoside, octyl glucoside and dodecyl maltoside. A stabilizer or stabiliser is a chemical that is used to prevent degradation due to, for example, heat and/or light. For example, antioxidants, such as oxygen scavengers, persistent radical scavengers and antiozonants can be added to further control the rate of generation of ROS (as disclosed herein). Sequestrants can also be added to form chelates complexes and inactivate trace metal ions on surfaces that would otherwise act as catalyst or inactivate the composition. UV stabilisers (UV absorbers and quenchers) can also be added to protect the composition from degradation. Polymers which includes polyelectrolytes such as polyacrylic acid (PAA), poly(sodium styrene sulfonate) (PSS), polyethylenimine (PEI), poly (lactide-co-glycolide) (PLGA), and fluoropolymers can be added to improve application onto surfaces as well as increase the retention time of the ROS.

The present invention also provides a method of synthesising an iron-iron oxide composition, comprising:

a) mixing the cashew testa extract with a tangerine extract in order to obtain a cashew testa extract composition;

wherein the cashew testa extract comprises phenolic compounds;

wherein the cashew testa extract comprises protein, amino acid, sugar, or a combination thereof.

In some embodiments, the tangerine extract is synthesised by:

a) dispersing tangerine peel powder in an extractant in order to form a mixture;

b) incubating the mixture; and c) filtering the mixture in order to obtain the tangerine extract;

wherein the tangerine extract comprises terpene compounds.

The tangerine extract can also be known as mandarin extract, or mandarin peel extract.

In some embodiments, the extractant is selected from an aqueous medium, alcohol, hydroxyethyl cellulose, propylene glycol, or a combination thereof.

In some embodiments, the incubation step (b) is performed for about 1 h to about 50 h.

In some embodiments, the incubation step (b) is performed under stirring.

In some embodiments, the terpene compounds is selected from $\alpha$-pinene, sabinene, myrcene, limonene, linalool, citronellal, neral, geranial, or a combination thereof.

In some embodiments, the tangerine extract further comprises phenolic compounds.

The present invention also provides an iron-iron oxide composition, comprising:

a) phenolic compounds selected from tannins, catechin, epicatechin, epigallocatechin, p-coumaric, gallic acid or a combination thereof;

b) protein, amino acid, sugar, or a combination thereof; and c) tangerine extract;

wherein the tangerine extract comprises terpene compounds.

The present invention also provides an iron-iron oxide composition, comprising:

a) phenolic compounds selected from tannins, catechin, epicatechin, epigallocatechin, p-coumaric, gallic acid or a combination thereof;

b) Protein, amino acid, sugar, or a combination thereof;

c) iron oxide particles; and d) tangerine extract;

wherein the iron oxide particles is at least partially passivated by the phenolic compounds; and wherein the tangerine extract comprises terpene compounds.

The present invention is in part predicated on the discovery that iron oxide particle formed from cashew testa extract can generate different ROS which include super oxide, singlet oxygen and hydroxyl radical. Due to the interaction of the iron oxide particles with the phenolic compounds of cashew testa extract, the ROS can be generated in the dark, i.e. in the absence of UV radiation. Further advantageously, as the ROS is continuous release by self-corrosion, an external stimulus is not required. When applied to a surface, this is beneficial for providing a constantly 'active' surface.

In particular, when the iron oxide particles are formed as iron core-iron oxide shell particles, the core-shell structure creates a special interface between iron core and iron complex shell which will change the potential of iron core and change the redox reaction pathway. Towards this end, it is believed that this self-corrosion process could also happen on $Fe/Fe_eO_3$, $Fe/Fe_eO_3$ particles and/or a combination thereof. The electrons generated from iron corrosion can be transferred into the conduction band (CB) of iron oxide in an energetically favourable way. The electrons in the CB are able to reduce oxygen and generate ROS. In other words, the electrons are donated from iron to iron oxide (CB) and reduce oxygen molecules to generate radicals in an energetically favorable way. The whole system does not rely on an external stimulus and the ROS generation process could be manipulated and have long-term stability. ROS will then kill contacted bacteria and virus. The ROS killing mechanism of the material while being similar to photo catalyst materials, such as ZnO and $TiO_2$, defers in that the iron/iron oxide particles is a self-catalysed material, it does not rely on photo irradiation to generate ROS. The iron particles sacrifices its iron core to generate ROS.

The ROS microbial killing mechanism is believed to be due to $O_2^-$, $H_2O_2$, $OH$, $^1O_2$ and/or $\alpha$-O.

The present invention provides a method of using the iron-iron oxide composition in anti-microbial applications. The iron-iron oxide compositions as disclosed herein can be in any applicable form. For example, the compositions can be a gel, liquid, or be in a sprayable form.

The present invention also provides a method of cleaning a non-biological surface, comprising:
  a) contacting an iron-iron oxide composition with the non-biological surface.

As used herein, 'cleaning' refers to an action of making something clean by, for example, removing dirt, marks or stains.

As is shown herein, the iron-iron oxide composition is also capable of degrading coloured compounds. By means of such degradation, the colour of the compounds is lost due to the disruption of its aromaticity/conjugated system.

The present invention also provides a method of disinfecting a non-biological surface, comprising:
  a) contacting an iron-iron oxide composition with the non-biological surface.

As used herein, 'disinfecting' refers to an action of cleaning something in order to destroy microorganisms, such as bacteria and/or viruses.

In some embodiments, the ROS can be generated in the dark. In other embodiments, the ROS can be generated in the absence of UV radiation. In other embodiments, the ROS generated is selected from $O_2^-$, $H_2O_2$, $OH$, $^1O_2$, $\alpha$-O, or a combination thereof.

In some embodiments, when $FeCl_3$ is used in the synthesis, the presence of Cl— anions can also contribute to the generation of ROS. The ROS can be $Cl$ and/or $Cl_2^-$. This is further advantageous in that the anti-microbial effect can be enhanced, and in particular, can also extend some distance from an applied surface. In this sense, an anti-microbial effect can be obtained without the microbe being in contact with the surface.

In some embodiments, the ROS are dispersible some distance away from an applied area or surface. In other embodiments, the distance is of about 0.1 mm to about 10 cm. In other embodiments, the distance is about 1 cm, 2 cm, 5 cm, 7 cm, or 10 cm.

In some embodiments, the iron-iron oxide composition can provide at least a 2 log reduction in microbial activity after 5 min.

The method can further comprise a step prior to (a) of applying the iron-iron oxide composition to an application medium.

In some embodiments, the application medium is a textile, plastic, or cellulose product.

In some embodiments, the application medium is a non-woven fabrics such as polyester or polypropylene. Such products can be can be used as a cleaning and/or disinfectant wipe, or form part of a personal protective equipment.

Accordingly, the iron-iron oxide composition can be used in detergents, aerosols, disinfectants, all-purpose cleaners, pest control solutions, and dish washing liquid.

For example, to be suitable for use as a spray, a viscosity reducing agent can be added in order to have a final product with a viscosity of about 80,000 cPs to about 900,000 cPs. As the iron particles are of a nano and/or micron size, they are able to be dispersed and suspended in air for a suitable duration. When sprayed on a surface, the non-aggregated iron particles can also homogenously dispersed on the surface.

The iron-iron oxide composition can be used in air purification as its able to decompose harmful particle matter, volatile organic compounds, polyaromatic hydrocarbons when these entities come in contact with, for example, a treated surfaces. The composition can also be used to form a coating for air filters and filtration systems as an additional layer of security.

The iron-iron oxide composition can also be used in combination with a resin or polymer such as varnish to form an anti-microbial coating. The iron-iron oxide composition can also be used in combination with a resin or polymer such as varnish to form a stain prevention coating.

The iron-iron oxide composition can also be used in waste water treatment or management. For example, the composition can be added to waste water in order to kill the microbes and/or reduce aromatic colorants and impurities.

It can also be used for water purification. In some embodiments, the iron-iron oxide composition can provide at least a 60% decrease in dye coloration. In some embodiments, the iron-iron oxide composition can provide at least a 60% decrease in Brilliant Blue R coloration.

The present invention also provides a method of using an iron-iron oxide composition in skin care applications, comprising:
  contacting an iron-iron oxide composition with a skin of a subject in need thereof.

The present invention also provides a use of an iron-iron oxide composition for cleaning a non-biological surface, comprising:
  a) contacting an iron-iron oxide composition with the non-biological surface.

The present invention also provides a use of an iron-iron oxide composition for disinfecting a non-biological surface, comprising:
  a) contacting an iron-iron oxide composition with the non-biological surface.

The present invention also provides a use of an iron-iron oxide composition in skin care applications, comprising:
  contacting an iron-iron oxide composition with a skin of a subject in need thereof.

The present invention also provides a disinfecting agent (or disinfectant) comprising the iron-iron oxide composition as disclosed herein.

The present invention also provides a cleaning agent comprising the iron-iron oxide composition as disclosed herein.

The present invention also provides a detergent, aerosol, pest control solution and dish washing liquid comprising the iron-iron oxide composition as disclosed herein.

The present invention also provides a coating composition for coating a surface comprising the iron-iron oxide composition as disclosed herein.

EXAMPLES

Process of Making the Composite

The iron-iron oxide composition is applied to the fabric by a mangle at the entry to a stenter. The fabric is then cured at 120° C. for 7 min through a 10 chamber stenter. It is then pass through the stenter again by applying a layer of water repellent coating to enhance the adhesion of the metal oxide to the fabric. Using this process, a coating is created on the surface on the fabric which ensure the durability of the anti-bacterial and/or anti-viral properties and can last for up to 30 washes. It also assists to optimise the Particle filtration efficiency of the mask. It acts as a dual function in this process.

Process of Making the Face Mask

To improve the efficacy of the mask, a non woven filter can be optionally fused together with the composite fabric layer using a heat transfer fusing machine. The several layers of the mask are then die cut according to the paper pattern of the mask using an auto-cut machine. It is then sewn together following the manufacturing instruction to form the shape of the mask.

Anti-Bacterial Test on Face Mask and Composites

Antibacterial Finishes on Textile Materials Assessment (AATCC 100-2012) was used. Briefly, the material was machine wash inside out at 80° F. with a gentle cycle, followed by tumble dry low. The material was then tested using the following conditions:

Staphylococcus aureus ATCC 29213
Dilution medium: PBS
Sample size #layers: 1
Sterilization: None
Neutralizer: 0.9% NaCl+0.2% Tween
Target inoc. Level: $(1.0-2.0)\times10^6$ CFU/ml
Inoculum size: 1.0 ml
Contact time: 24 h
Temperature: 37+/−2° C.

It was found that after 24 h, 98-100% reduction on bacterial was observed.

Bacterial Filtration Efficiency 1 (ASTM TEST METHOD F2101)

A suspension of Staphylococcus aureus, ATCC 29213, was delivered to the test article to determine filtration efficiency. A challenge level of greater than $10^7$ colony forming units (CFU) was pumped through an aerosol spray. This method was adapted from ASTM F2101. This test was not performed at a fixed flow rate of 28.3 Litres/min, but at a more strict level. The aerosol particles were not drawn through are drawn through a six stage Andersen sampler for collection. However, adequate controls are included to verify the reliability of this study. All test method acceptance criteria were met. The conditions are as follows:

Challenge Flow Rate: Aerosol spray
Conditioning Parameters: 85±5% relative humidity (RH) and 21±5° C. for a minimum of 4 hours
Area Tested: 15 cm×15 cm
Side Tested: Black side Challenge Level: $1.8\times10^7$ CFU
Mean Particle Size (MPS): ~0.8 μm
After 20 washes, the 5 samples tested has an average bacterial filtration efficiency of 97.2%. After 30 washes, the 5 samples tested has an average bacterial filtration efficiency of 95.6%.

As the face mask can filter the S. aureus ATCC 29213 bacteria which has a size of ~0.8 μm by up to 99.9998%, the face mask meets the fine particulate matter of 2.5 ($PM_{2.5}$).

Bacterial Filtration Efficiency 2 (BS EN 14683:2019)
Area contacting with the bacterial challenge: Inside of the mask
Flowrate: 28.3±0.3 L/min
Mean particle size of the challenge aerosol: 3 μm±0.3 μm
Test area: Approximately 50 cm$^2$
The 5 face masks tested all have a Bacterial Filtration Efficiency of more than 99.85%.

Anti-Viral Efficacy
Cell lines: Madin-Darby Canine Kidney (MDCK) cell
Viruses: Influenza A virus (PR8 #2-3)
Drug/Chemical: Cover-slides coated with anti-microbial agent (Labelled Control sample, sample 28 and sample 60)
Media: DMEM-E10, Overlay media
Virus treatment with coverslides coated with anti-microbial agent for 1 h incubation—Influenza A virus were diluted to $10^5$ PFU/100 μL and added upon the control, sample 1 and sample 2 coated cover-slides. After which, a thin parafilm was used to cover on each slide to ensure virus contact with the coated cover-slide. Supernatants were harvested for plaque assay at 1 h post-incubation.

Plaque assay—MDCK cells were inoculated on 12-well plates separately. Influenza-treated supernatants were serially diluted to $10^{-4}$ and 250 μL of diluted supernatants were added to MDCK cells. Plates were incubated for 1 h with 15 mins rocking intervals. Plates were then washed with 1×PBS twice and 0.3% agarose overlay media were added to each well. Plates were incubated 2 days. Lastly, overlay media was removed and crystal violet was added to stain for countable plaques. Plaques were then calculated using plaque forming units per mL.

In comparison to control group, the result showed that the samples was sufficient to inhibit virus>4.5-log unit (or at least 0.5-log unit inhibition). The average of plaque assay virus titres found from control and samples were $4.53\times10^4$ PFU/mL and 0 PFU/ml (or at least $9.06\times10^3$ PFU/mL) respectively.

With P22 bacteriophage and based on ISO 18184:2019, the face mask/composite showed an overall reduction of 99.98% after a 24 h contact time.

With Enterovirus 71 and based on ISO 18184:2014, the face mask/composite showed an overall reduction (antiviral activity rate) of 99.92% after a 2 h contact time.

With H1N1 Influenza A virus and based on ISO 18184: 2014, the face mask/composite showed an overall reduction (antiviral activity rate) of 99.93% after a 2 h contact time.

With H3N2 Influenza A virus and based on ISO 18184: 2014, the face mask/composite showed an overall reduction (antiviral activity rate) of 97.25% after a 5 min contact time. The face mask/composite showed an overall reduction (antiviral activity rate) of 99.52% after a 2 h contact time. In contrast, face mask with iron oxide alone showed an overall reduction (antiviral activity rate) of 99.12% after a 2 h contact time, while face mask with cashew testa extract alone showed an overall reduction (antiviral activity rate) of 92.43% after a 2 h contact time.

With SARS-CoV-2 virus and based on ISO 18184:2019, the face mask/composite showed an overall reduction (anti-viral activity rate) of 99.08% after a 2 h contact time.

The face mask/composite was subjected to a 15 hand washes following 60 min exposure to Human Coronavirus strain OC43 and the anti-viral efficacy tested.

| Test Fabric Designation | Timed Exposure | Log₁₀ TCID₅₀ Reduction | Standard Deviation | Percent Reduction |
|---|---|---|---|---|
| sample | 60 | 2.4 | 0.25 | 99.6 |
| sample (Washed 15 times) | minutes | 2.0 | 0.29 | 99.0 |

Under conditions of this evaluation, the face mask/composite may be categorised to have a good antiviral effect following a 60 min exposure.

Water Repellency—Spray Test
(BS EN 24920/ISO 4920/DIN EN 24920/AATCC 22)
Water temperature: 27 degree Celsius
Water flow rate: 26 seconds
Temperature: 21° C.
Humidity: 66%
The average of the repellency over 3 samples is more than 70.
Cytotoxicity Test (ISO 10993-5; ISO 10993-12)
The composite and face mask has a Grade 0, indicating that it has no cytotoxic effect.
Cashew Testa Extract
Appearance: Brown liquid
Physicochemical characteristics: High radical scavenging activity (antioxidant activity)
Composition: Mixture of compounds including catechin, epicatechin, tannic acid
Thermally stable up 200° C.
Solubility in water is 2850 g/L
Extraction of Cashew Testa—Comparator
The skins were milled at 500 rpm for 1 h until it turned into a fine powder, using a ball miller. Then, the powder was collected and MilliQ water in a ratio of 1:10 was added. The entire mixture was stirred and incubated in a water bathe for 1 h, at 37° C. Next, it was centrifuged at 10,000 g for 10 min at 4° C. The supernatant was taken, carefully passed through a 0.2-μm filter, and freeze dried.
Extraction of Cashew Testa—Method 1
To obtain the cashew testa extract, the method as disclosed in International Journal of Engineering Technology Science and Research, Vol 4(8), page 671-675 (ISSN: 2394-3386) can be used. For example, the testa can be boiled in water at 40° C. to 100° C. for 1-24 hours. This extracts the water soluble polyphenols from the testa such as tannins. After heating, the solution is carefully filtered to remove any remaining solid mass.

Figure 14:
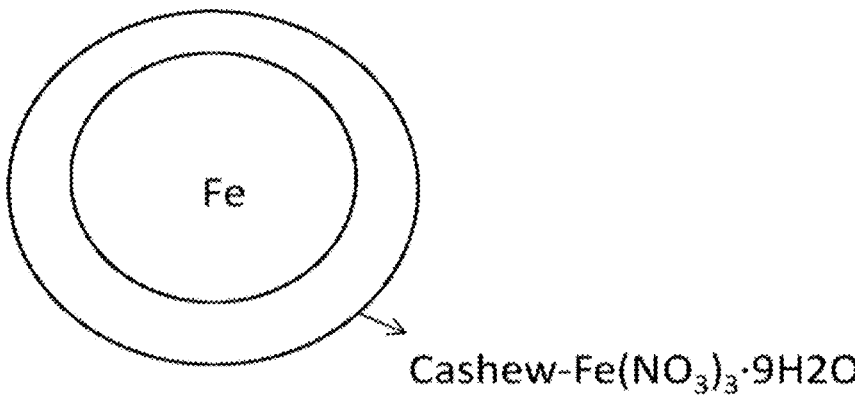
FIG. 14 is an exemplary schematic representation of the cashew testa extract composition.

Example 1: Synthesis of Iron-Polyphenol Complex Particles (Fe-Cashew Core Covered with a Shell of $Fe(NO_3)_3 \cdot 9H_2O$)—Composite A Fresh cashew extract was prepared as previously described and allowed to cool to room temperature. 1-50 mL Cashew extract and 2-10 g of iron powder was combined and this mixture was bubbled with nitrogen gas for 1 h. During this process, iron and cashew extract would be linked to form the compound Fe-cashew. Separately, the solution of 1-90 mL 0.1 M $Fe(NO_3)_3 \cdot 9H_2O$ was prepared, and bubbled with nitrogen gas for 1 h. Subsequently, the Fe-cashew solution and 0.5 M $Fe(NO_3)_3 \cdot 9H_2O$ were combined. The reaction was continued for 24 h under nitrogen, and the product was stored at 4° C. This would produce a Fe-cashew as the core of the nanoparticles, which is covered with a shell of $Fe(NO_3)_3 \cdot 9H_2O$. (FIG. 14)

Alternatively, 2-10 g Fe+1-50 ml of cashew extract were combined and incubated at 1 h, room temperature with constant agitation. Then 1-90 ml of 0.1M $FeCl_3$ was added and the mixture was incubated at 1 h, room temperature with constant agitation. The entire mixture was centrifuged at 5000 rpm and the precipitate were collected. It was washed with water and then ethanol.

In the examples as disclosed herein, different types of Fe salts were tested; for example, $FeCl_3$, $FeSO_4$, $Fe_2(SO_4)_3$, $Fe(NO_3)_3$, $Fe(NO_3)_2$.

Figure 15:
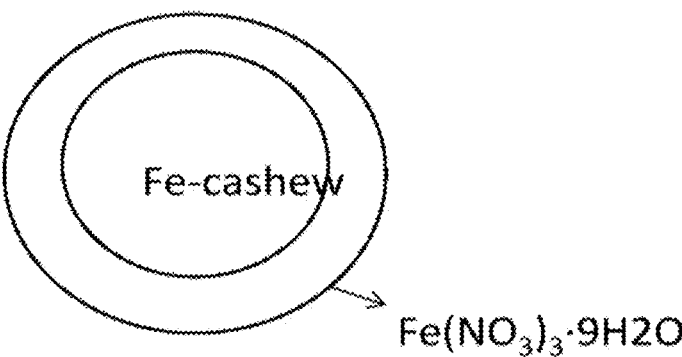
FIG. 15 is an exemplary schematic representation of the cashew testa extract composition.

Example 2: Synthesis of Iron-Polyphenol Complex Particles (Fe Core Covered with a Shell of Cashew-$Fe(NO_3)_3 \cdot 9H_2O$)—Composite B 2-10 g of iron powder in water was bubbled with nitrogen gas for 1 h. Separately, 1-50 ml cashew solution and 1-90 ml 0.1 M $Fe(NO_3)_3 \cdot 9H_2O$ was combined, and bubbled with nitrogen gas for 1 h to form a cashew-$Fe(NO_3)_3 \cdot 9H_2O$ linked compound. Subsequently, the iron solution and cashew-$Fe(NO_3)_3 \cdot 9H_2O$ solution were combined. The reaction was continued for 24 h under nitrogen, and the product was stored at 4° C. This would produce nanoparticle with Fe as the core, which is covered with a shell of cashew-Fe $(NO_3)_3 \cdot 9H_2O$. (FIG. 15)

Example 3: Synthesis of Cashew Extract Activated Iron Powder (Composite C)

Fresh iron powder (1-10 g) was mixed with cashew testa extract (1-50 ml), and the mixture was stirred at 80° C. for 24 hours. After cooling to room temperature, solid residuals of the composite C were collected.

Example 4: Synthesis of Cashew Extract Iron Nanoparticles (Composite D)

A solution of 0.1 M $FeCl_3$ was prepared by adding 16.23 g of $FeCl_3$ in 1 litre of Milli-Q water. Subsequently, 1-90 mL 0.1 M $FeCl_3$ solution was added to 1-50 mL cashew extract. The formation of iron-cashew nanoparticles was marked by the appearance of precipitate, and this was collected by centrifuging at 7000 rpm. Then the iron-cashew nanoparticles powders were frozen at −20° C. and then were dried in a freeze-dryer at −45° C. with the pressure at 10 Pa for 24 h.

Alternatively, 1-90 mL 0.1 M $FeCl_3$ solution and 1-50 mL cashew extract can be incubated at 1 h, room temperature. Then the entire mixture was centrifuged at 5000 rpm and the precipitate were collected. It was washed with water and then ethanol.

Example 5: Synthesis of Cashew Extract Iron Nanoparticles (Composite E)

1-90 mL 0.1 M $FeCl_3$+1-50 mL cashew testa extract were combined and incubated at 1 h, room temperature. Then 1 M NaOH was added until the pH was 11. The entire mixture was centrifuged at 5000 rpm and the precipitate were collected. It was washed with water and then ethanol.

Example 6: Fe—$FeCl_3$ as the Core and Cashew as the Shell (Composite F)

1-10 g Fe+1-90 ml of 0.1M $FeCl_3$ were combined and incubated at 1 h, room temperature with constant agitation. Then 1-50 ml of cashew extract was added and the mixture was incubated at 1 h, room temperature with constant agitation. The entire mixture was centrifuged at 5000 rpm and the precipitate were collected. It was washed with water and then ethanol.

Energy-Dispersive X-Ray Spectroscopy (EDX) Analysis of Iron Particles and/or Iron Oxide Particles The EDX results as shown below are based on Example 1, 2 and 6, with different amounts of iron particle, iron oxide precursor and cashew testa extract.

| Element | Wt % | Wt % Sigma |
|---|---|---|
| C | 50.60 | 0.62 |
| O | 27.13 | 0.56 |
| Cl | 0.89 | 0.08 |
| Fe | 21.37 | 0.42 |
| Total: | 100.00 | |

| Element | Wt % | Wt % Sigma |
|---|---|---|
| C | 36.22 | 0.36 |
| O | 39.39 | 0.32 |
| Cl | 1.14 | 0.04 |
| Fe | 23.25 | 0.23 |
| Total: | 100.00 | |

| Element | Wt % | Wt % Sigma |
|---|---|---|
| C | 31.15 | 0.40 |
| O | 40.18 | 0.34 |
| Cl | 1.43 | 0.05 |
| Fe | 27.24 | 0.27 |
| Total: | 100.00 | |

| Element | Wt % | Wt % Sigma |
|---|---|---|
| C | 31.25 | 0.38 |
| O | 40.38 | 0.33 |
| Cl | 0.77 | 0.04 |
| Fe | 27.61 | 0.26 |
| Total: | 100.00 | |

| Element | Wt % | Wt % Sigma |
|---|---|---|
| C | 4.52 | 0.31 |
| O | 15.09 | 0.18 |
| Al | 0.28 | 0.05 |
| Si | 0.38 | 0.05 |
| Cl | 0.44 | 0.04 |
| Fe | 79.29 | 0.32 |
| Total: | 100.00 | |

Scanning Electron Microscope (SEM) Analysis

SEM results from Example 1, 2 and 6 are shown in FIG. 20A-E.

Anti-Microbial Effect of Iron Cashew Particles Against *S. aureus*

| | 5 min | 15 min | 1 hour | 24 hour |
|---|---|---|---|---|
| Untreated | $4.64 \times 10^7$ CFU/ml | $4.0 \times 10^7$ CFU/ml | $1.44 \times 10^7$ CFU/ml | $6.8 \times 10^6$ CFU/ml |
| Iron-cashew | $6 \times 10^4$ CFU/ml (3 log reduction) | $0 \times 10^4$ CFU/ml (>3 log reduction) | $0 \times 10^2$ CFU/ml (>5 log reduction) | 0 (>6 log reduction) |

Quantitative Suspension Test for Evaluation of Bacterial Activity

| Test Organism | Initial suspension (N) No = (1/10N) $1.5 \times 10^8 \le$ N $\le 5 \times 10^8$ | Final Count Na 1 min | Final Count Na 5 min | R (Log10 Reduction) = Log No − Log Na Criteria: R ≥ 5.0 1 min | R (Log10 Reduction) = Log No − Log Na Criteria: R ≥ 5.0 5 min |
|---|---|---|---|---|---|
| *Straphylococcus aureus* ATCC 6538 | $2.0 \times 10^8$ | $3.0 \times 10^2$ | $1.0 \times 10^2$ | 5.82 | 6.30 |
| *Escherichia coli* ATCC 10536 | $1.8 \times 10^8$ | 90 | 10 | 6.31 | 7.26 |
| *Pseudomonas aeruginosa* ATCC 15442 | $1.5 \times 10^8$ | $1.0 \times 10^3$ | $310 \times 10^2$ | 5.20 | 6.20 |
| *Enterococcus faecium* ATCC 6057 | $3.0 \times 10^8$ | $2.2 \times 10^3$ | $6.0 \times 10^2$ | 5.14 | 5.70 |
| *Salmonella typhimurium* ATCC 13311 | $2.7 \times 10^8$ | $5.0 \times 10^2$ | 80 | 5.73 | 6.53 |

The requirements of bactericidal efficacy according to EN 1276 was satisfied.

Anti-Viral Efficacy

| Virus Types | (NO) | $lg(Va_{0h})$ ($lgTCID_{50}$/mL) | $lg(Vb_{2h})$ ($lgTCID_{50}$/mL) | $lg(Vc_{2h})$ ($lgTCID_{50}$/mL) |
|---|---|---|---|---|
| SARS-CoV-2 | 1 | 6.67 | 6.53 | 4.32 |
| | 2 | 6.63 | 6.51 | 4.35 |
| MDCK | 3 | 6.59 | 6.48 | 4.27 |

-continued

| Virus Types (NO) | $1g(Va_{0h})$ $(1gTCID_{50}/mL)$ | $1g(Vb_{2h})$ $(1gTCID_{50}/mL)$ | $1g(Vc_{2h})$ $(1gTCID_{50}/mL)$ |
|---|---|---|---|
| Average Value of $1gTCID_{50}/mL$ | 6.63 | 6.51 | 4.31 |
| Antiviral Activity Value | | 2.19 | |
| Antiviral Activity Rate (%) | | 99.36 | |

With SARS-CoV-2 and based on ISO 18184:2019, the iron-iron oxide composition showed an antiviral activity rate of 99.36% after a 2 h contact time.

Figure 16:
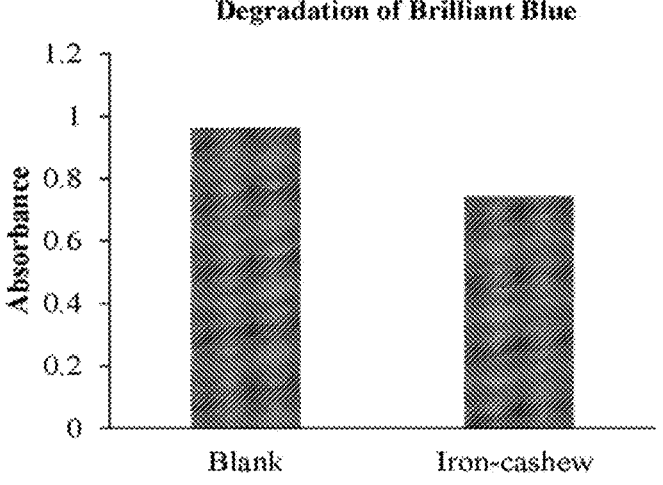
FIG. 16 shows Coomasie Brilliant Blue R dye degradation after exposure to cashew testa extract composition.
Figure 17:
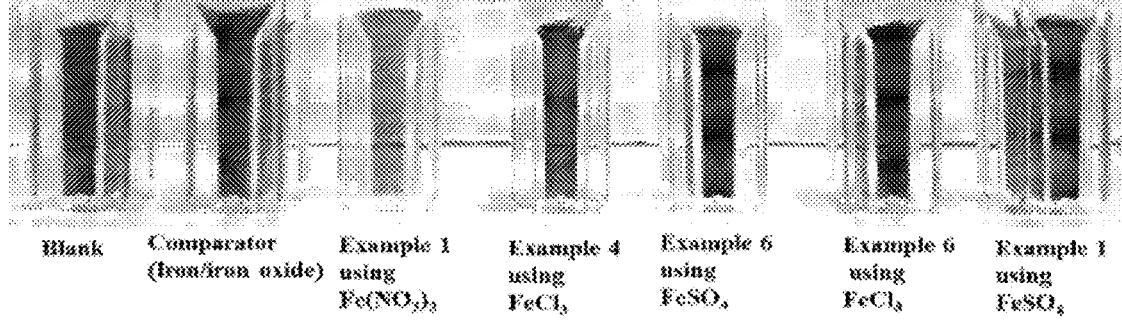
FIG. 17 shows Coomasie Brilliant Blue R dye degradation after exposure to cashew testa extract composition.

Coomasie Brilliant Blue R Dye Degradation 0.1 g of Iron-cashew testa nanoparticles were added to Brilliant blue dye and after 15 min incubation at room temperature the absorbance was measured at 550 nm using a UV spectrophotometer. Blank was used as the control. The results are shown in FIGS. 16 and 17.

Absorbance (arbitrary units) at 550 nm after 15 min:
Blank=3.243
Comparator (iron/iron oxide alone)=2.905
Example 1 using $Fe(NO_3)_3$=0.882
Example 4 using $FeCl_3$=2.59
Example 6 using $FeSO_4$=2.926
Example 6 using $FeCl_3$=2.87
Example 1 using $FeSO_4$=2.81

The results show that compared to the blank and comparator, the cashew testa extract composition (when comprising iron/iron oxide particles) is capable of degrading dyes.

Application of Anti-Microbial Composition on Textile

Pad-Dry-Cure is most widely used for 100% scoured cotton fabric. The Cashew testa extract was treated with 1-80 percent on weight of fabric (owf) under room temperature. The treated fabric was passed between the rollers two to three times at a uniform pressure at 1.5 bar for better penetration of finishing agent and to squeeze out excess liquid from the fabric. The fabric was then dried at 110° C. and cured at 130° C. in a curing chamber within 3 minutes. The cashew testa extract has a 99% antimicrobial activity against the common gram positive bacteria *Staphylococcus aureus*.

Application of Anti-Microbial Composition (with Tangerine Extract) on Textile

Pad-Dry-Cure is most widely used for 100% scoured cotton fabric. The mandarin (tangerine) peel extract was treated with 1-80 percent on weight of fabric (owf) under room temperature. The treated fabric was passed between the rollers two to three times at a uniform pressure at 1.5 bar for better penetration of finishing agent and to squeeze out excess liquid from the fabric. The fabric was then dried at 110° C. and cured at 130° C. in a curing chamber within 3 minutes.

Anti-Microbial Test

This test is performed with treated and non-treated samples of the test material. The material was cut into 4.8 cm diameter. In accordance with AATCC 100 test procedure, 1 ml of test organism suspension at about $1-2\times10^5$ CFU/ml is inoculated to the test sample. Samples of the cashew testa extract composition and iron particles and/or iron oxide particles were tested. The inoculated swatches were incubated for a specified contact time. At the appropriate contact time, neutralizing broth was added to each container and the containers were shaken for 1 minute to release the inoculum from the test swatches and into the neutralizing broth. Serial dilutions were made and the plates incubated. After incubation, colonies of recovered are counted and used to determine percent reductions.

The results below relates to fabric samples. Percent reductions are determined by comparing the sample after the contact time to the sample immediately after inoculation. Percent reduction is translated into log reduction by the following:

90% reduction=1 log reduction;
i.e. 1,000,000 reduced to 100,000 is a 1 log reduction
99% reduction=2 log reduction;
i.e. 1,000,000 reduced to 10,000 is a 2 log reduction
99.9% reduction=3 log reduction;
i.e. 1,000,000 reduced to 1,000 is a 3 log reduction
99.99% reduction=4 log reduction;
i.e. 1,000,000 reduced to 100 is a 4 log reduction Testing information:
*Staphylococcus aureus* ATCC 29213
Dilution medium: PBS
Sample size #layers: 1
Sterilization: None
Neutralizer: 0.9% NaCl+0.2% Tween
Target inoc. Level: $(1.0-2.0)\times10^5$ CFU/ml
Inoculum size: 1.0 ml+/−0.1 ml
Contact time: 24 h
Temperature: 37+/−2° C.

| AATCC 100 Test Method at 24 hours contact time | *S. aureus* |
|---|---|
| Cashew | 3 log reduction |
| Cashew After 30 × washes | 2 log reduction |
| Iron/Iron oxide | 3 log reduction |

ATP Tests on Long Term Coating Durability (One Application)

| | reading | | |
|---|---|---|---|
| Treated Surfaces | ATP reading before | ATP reading after 14 days | ATP reading after 30 days |
| Textile | 4477 | 14 | 50 |

Results for Mandarin and (Iron Oxide+Cashew) Impregnated on Face Mask at Shorter Contact Time

| Time course killing of *S. aureus* (on textiles) | 15 mins | 20 mins | 30 mins | 1 hour |
|---|---|---|---|---|
| Iron/Iron oxide + Cashew testa | 2 log reduction | 2 log reduction | 3 log reduction | >3 log reduction |
| Mandarin extract | 1 log reduction | 2 log reduction | 2 log reduction | >2 log reduction |

Results for Test Against H3N2 Virus

| Test Results against H3N2 at 2 hour incubation | Cashew | Mandarin | Iron/Iron oxide | Iron/ Iron oxide at 1 g/L + Cashew |
|---|---|---|---|---|
| Results | 92.43% 1.13 log reduction | 96.91% 1.51 log reduction | 99.12% 2.06 log reduction | 99.52% 2.32 log reduction |

Results for Test Against HCoV-229E Virus

| Virus Types | (NO) | $1g(Va_{0min})$ $(1gTCID_{50}/mL)$ | $1g(Vb_{15min})$ $(1gTCID_{50}/mL)$ | $1g(Vc_{15min})$ $(1gTCID_{50}/mL)$ |
|---|---|---|---|---|
| HCoV- | 1 | 6.32 | 6.28 | 4.44 |
| 229E | 2 | 6.37 | 6.34 | 4.46 |
| MDCK | 3 | 6.34 | 6.21 | 4.47 |
| cells | | | | |
| Average Value of $1gTCID_{50}/mL$ | | 6.34 | 6.28 | 4.46 |
| Antiviral Activity Value | | | 1.88 | |
| Antiviral Activity Rate (%) | | | 98.68 | |

| Virus Types | (NO) | $1g(Va_{0h})$ $(1gTCID_{50}/mL)$ | $1g(Vb_{2h})$ $(1gTCID_{50}/mL)$ | $1g(Vc_{2h})$ $(1gTCID_{50}/mL)$ |
|---|---|---|---|---|
| HCoV- | 1 | 6.39 | 6.35 | 4.39 |
| 229E | 2 | 6.45 | 6.42 | 4.37 |
| MDCK | 3 | 6.42 | 6.39 | 4.36 |
| cells | | | | |
| Average Value of $1gTCID_{50}/mL$ | | 6.42 | 6.39 | 4.37 |
| Antiviral Activity Value | | | 2.05 | |
| Antiviral Activity Rate (%) | | | 99.10 | |

| Virus Types | (NO) | $1g(Va_{0h})$ $(1gTCID_{50}/mL)$ | $1g(Vb_{24h})$ $(1gTCID_{50}/mL)$ | $1g(Vc_{24h})$ $(1gTCID_{50}/mL)$ |
|---|---|---|---|---|
| HCoV- | 1 | 6.42 | 6.39 | 4.37 |
| 229E | 2 | 6.46 | 6.43 | 4.36 |
| MDCK | 3 | 6.44 | 6.41 | 4.34 |
| cells | | | | |
| Average Value of $1gTCID_{50}/mL$ | | 6.44 | 6.41 | 4.36 |
| Antiviral Activity Value | | | 2.08 | |
| Antiviral Activity Rate (%) | | | 99.17 | |

Levels of ·OH Generate from Iron-Cashew Particles in Water Analyzed by Hydroxyphenyl Fluorescein (HPF) Probe Example 1 using $Fe(NO_3)_3$ and Example 4 using $FeCl_3$ were used as the samples. 0.01 g of sample was added into 1.5 mL centrifuge tubes. 1 mL of 10 μM HPF testing solution was added in each sample. The solution was well mixed by vortex and kept at room temperature in the dark. At a certain time point, the solution was centrifuged (16800 rpm×5 min), and 100 μL of solution was transferred to a black 96 well microplate for fluorescence testing. Fluorescence at 490/515 nm was collected with a microplate reader.

Figure 18:
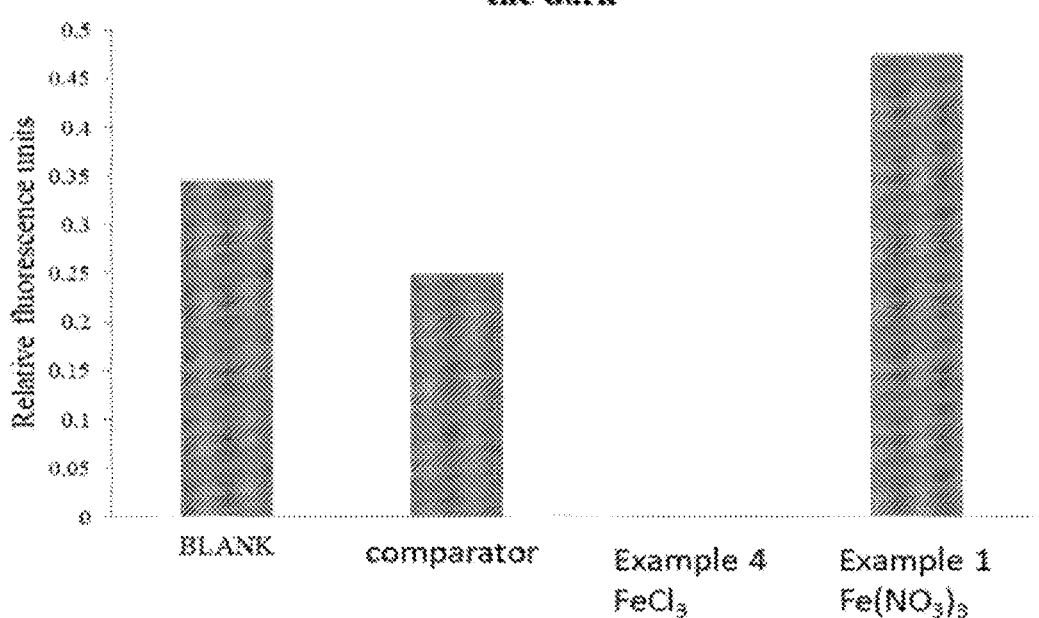
FIG. 18 shows OH radical measurement results after exposure to cashew testa extract composition.

The type of ROS that $FeNO_3$-Cashew (Example 1) releases in the dark after 2 hours was ·OH radicals. $FeCl_3$-cashew (using Method 1) does not release ·OH radicals (FIG. 18).

Levels of ·$O_2$ Radical from Iron-Cashew Particles Measured by Nitroblue Tetrazolium (NBT)

Example 1 using $Fe(NO_3)_3$ and Example 4 using $FeCl_3$ were used as the samples.

Figure 19:
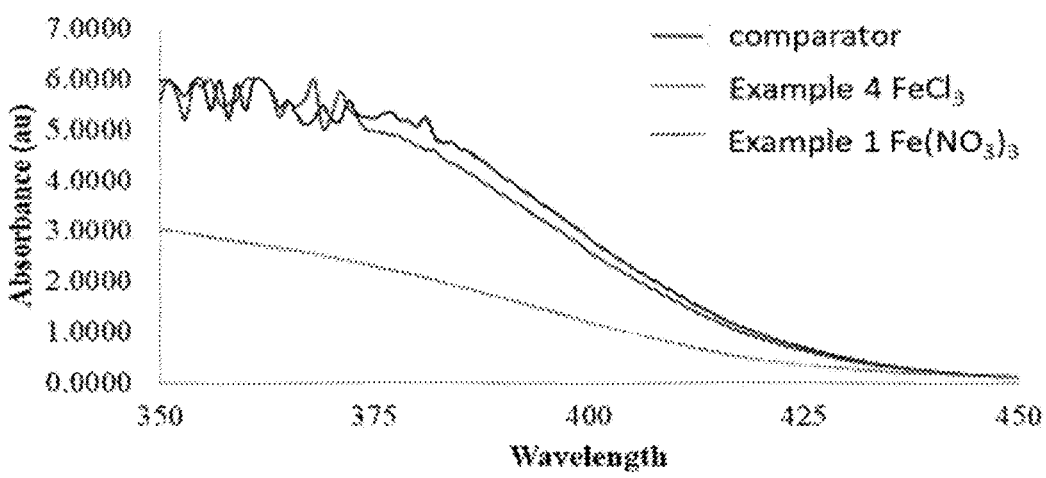
FIG. 19 shows $O_2$ radical measurement results after exposure to cashew testa extract composition for 2 h.
Figure 20A:
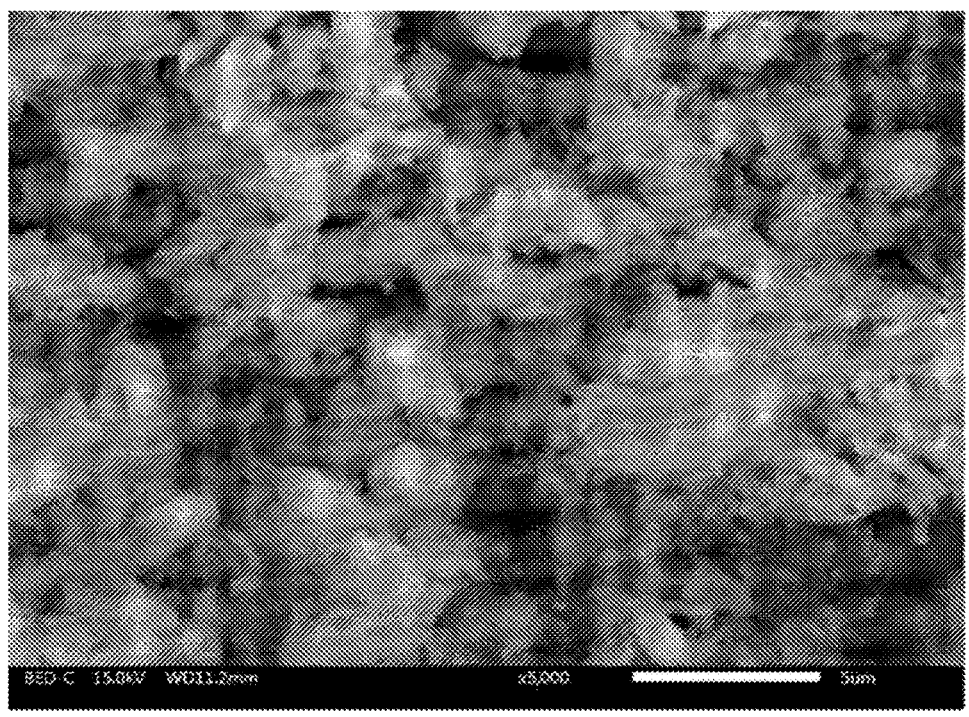
FIG. 20A-E shows Scanning Electron Microscopy (SEM) images of the iron-iron oxide composition.
Figure 20B:
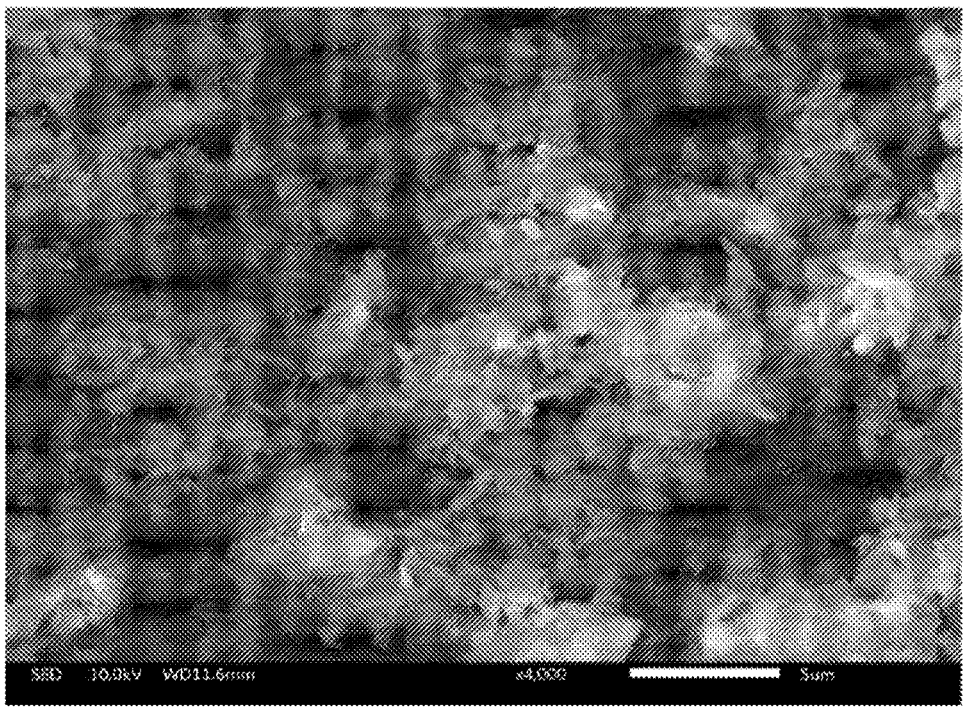
Figure 20C:
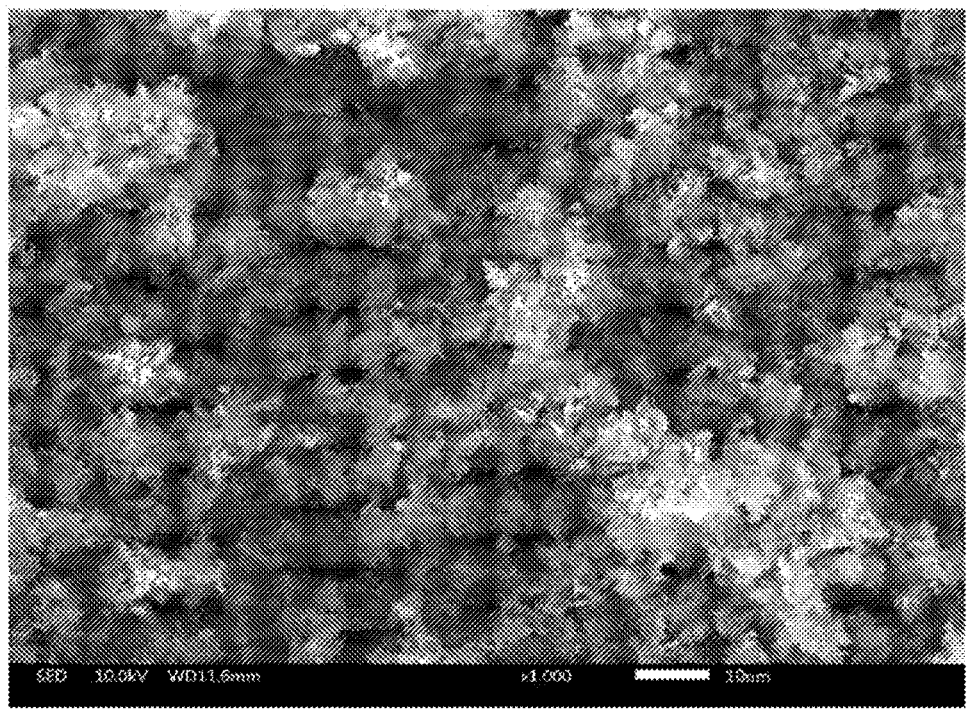
Figure 20D:
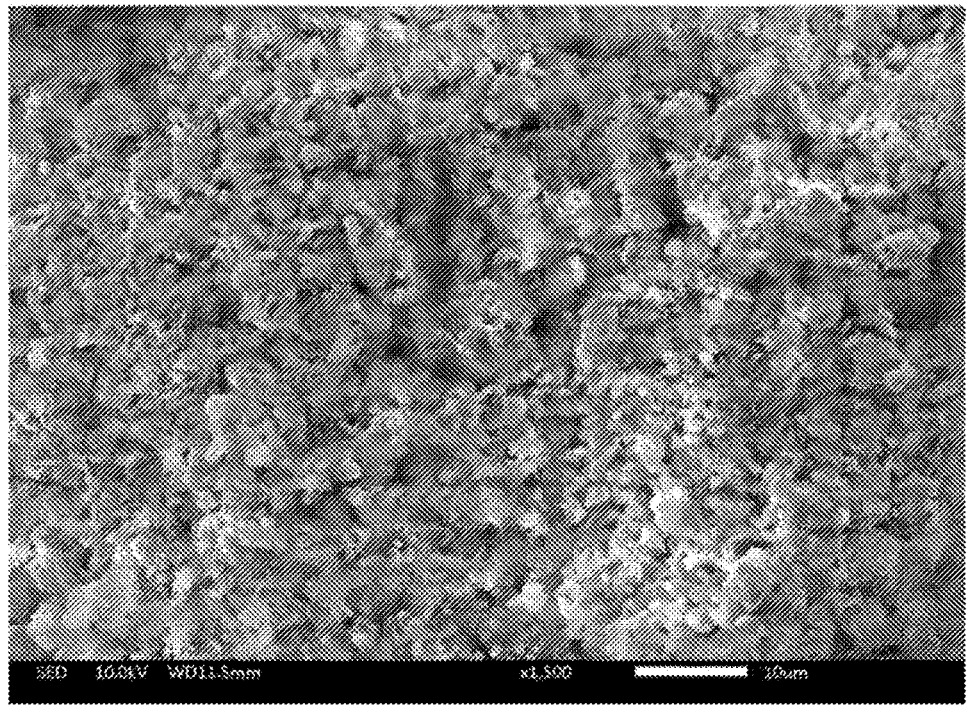
Figure 20E:
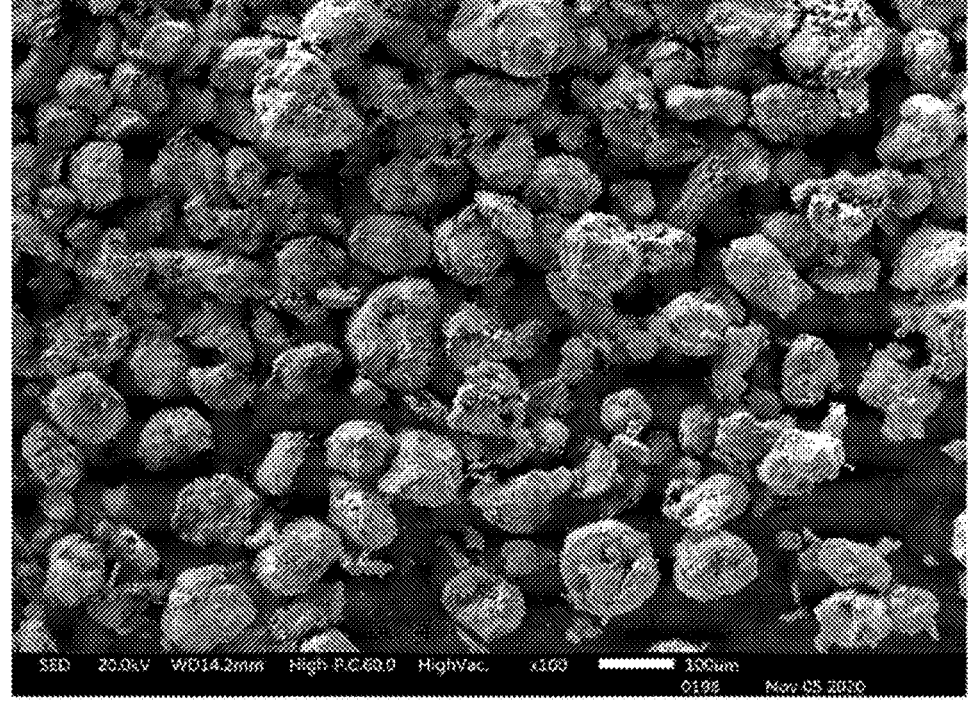

0.2 g of iron-cashew particles was added to 10 mL of 1000 $mgL^{-1}$ NBT in water and kept in the dark. At a certain time point, the absorption spectrum of NBT was measured by a UV-vis-NIR spectrophotometer. The absorption peak NBT continues to decrease, at 2 h, indicating the continuous generation of ·$O_2$ radicals by $FeCl_3$-cashew and react with NBT (FIG. 19).

The comparator was prepared in a similar manner. At the 2 h interval, there is no change in the absorbance value of NBT.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An iron-iron oxide composition, comprising:
   a) a cashew testa extract; and
   b) iron-iron oxide core-shell particles, the core is an elemental iron core or an iron alloy core, and the shell is an iron oxide shell; wherein the cashew testa extract comprises a component selected from protein, amino acid, sugar, phenolic compounds or a combination thereof, the phenolic compounds selected from tannins, catechin, epicatechin, epigallocatechin, p-coumaric, gallic acid, or a combination thereof; and
   wherein the iron-iron oxide particles are at least partially passivated by the protein, amino acid, sugar, phenolic compounds, or a combination there of,
   wherein the shell further comprises a component from cashew testa extract.

2. The iron-iron oxide composition according to claim 1, wherein the iron-iron oxide particles are further at least partially passivated by a carboxylate acid moiety or a hydroxyl moiety.

3. The iron-iron oxide composition according to claim 1, wherein the iron-iron oxide particles have an average particle size of about 1 μm to about 800 μm.

4. The iron-iron oxide composition according to claim 1, wherein the shell has a thickness of about 5 nm to about 1 μm.

5. The iron-iron oxide composition according to claim 1, having an iron content relative to the iron-iron oxide composition of about 20 w/w % to about 80 w/w % and an oxygen content relative to the iron-iron oxide composition of about 15 w/w % to about 40 w/w %.

6. The iron-iron oxide composition according to claim 1, the iron-iron oxide composition has a carbon content relative to the iron-iron oxide composition of about 4 w/w % to about 50 w/w %.

7. The iron-iron oxide composition according to claim 1, further comprising an excipient selected from stabilising agent, dispersant, colorant, or a combination thereof.

8. A method of disinfecting a surface or killing microbial in the dark, comprising:
   a) contacting an iron-iron oxide composition according to claim 1 surface or the microbe.

9. The method according to claim 8, further comprising a step prior to (a) of applying the iron-iron oxide composition to an application medium.

10. The method according to claim 8, wherein the surface is a non-biological surface.

11. The method according to claim 8, wherein the iron-iron oxide composition provides at least a 2 log reduction in microbial activity after 5 min.

12. A composite material, comprising a porous fabric impregnated with an iron-iron oxide composition according to claim 1 and coated with a water repellent coating on at least one side of the porous fabric, wherein the iron-iron oxide composition is present at 0.1% w/w to 5% w/w relative to the composite material; and wherein the water repellent coating has a thickness of 10 μm to 500 μm.

13. The composite material according to claim 12, wherein the porous fabric is a fabric comprising cotton and spandex;

wherein the cotton is about 90% w/w relative to the fabric; and wherein the spandex is about 10% w/w relative to the fabric.

14. The composite material according to claim 12 formed as a face covering structure of a face marsk, the face mask comprising:

a) a face covering structure configured to cover at least a mouth and nasal passages of a user; and b) an attachment structure comprising:

i) a drawstring attached to opposed sides of the face covering structure, for securing the face covering structure to a face of the user; and ii) a fastener releasably attached to the drawstring to maintain the drawstring in a tightened or loosened position;

wherein the drawstring is arranged to form ear straps for looping behind respective ears of the user and a neck strap for looping behind a neck of the user; and wherein the fastener is attached to the neck strap.

15. The composite material according to claim 14, wherein the fastener is a cord lock and the drawstring is threaded through eyelets of the cord lock.

16. The composite material according to claim 14, wherein each ear strap comprises a section of the drawstring that is attached at a first point on one of the opposed sides, and is threaded through an attachment loop at a second point that is spaced from the first point.

17. The composite material according to claim 14, wherein the face covering structure comprises a filter layer, wherein the filter layer is sandwiched between an outer fabric layer and an inner fabric layer, wherein the outer fabric layer is a composite material according to claim 12.

18. The composite material according to claim 14, wherein the face covering structure is configured to at least partially cover a submental triangle of the user.

19. The composite material according to claim 14, wherein the face covering structure is configured to at least partially cover a zygomatic region of the user.

\* \* \* \* \*